United States Patent
Talagala et al.

(10) Patent No.: US 8,782,344 B2
(45) Date of Patent: Jul. 15, 2014

(54) SYSTEMS AND METHODS FOR MANAGING CACHE ADMISSION

(75) Inventors: Nisha Talagala, Livermore, CA (US); Swaminathan Sundararaman, Santa Clara, CA (US); Amar Mudrankit, San Jose, CA (US)

(73) Assignee: Fusion-io, Inc., Salt Lake City, UT (US)

( * ) Notice: Subject to any disclaimer, the term of this patent is extended or adjusted under 35 U.S.C. 154(b) by 102 days.

(21) Appl. No.: 13/349,417

(22) Filed: Jan. 12, 2012

(65) Prior Publication Data

US 2013/0185508 A1 Jul. 18, 2013

(51) Int. Cl.
*G06F 12/00* (2006.01)

(52) U.S. Cl.
USPC ........... 711/118; 711/100; 711/113; 711/144; 711/145; 711/154; 711/156; 711/202; 711/203; 711/205; 711/207; 711/221; 711/E12.027; 711/E12.058

(58) Field of Classification Search
USPC ......... 711/100, 113, 118, 144, 145, 154, 156, 711/202, 203, 205, 207, 221, E12.027, 711/E12.058
See application file for complete search history.

(56) References Cited

U.S. PATENT DOCUMENTS

| | | | |
|---|---|---|---|
| 6,871,257 B2 | 3/2005 | Conley | |
| 6,914,853 B2 * | 7/2005 | Coulson | 365/236 |
| 7,480,766 B2 | 1/2009 | Gorobets | |
| 7,523,249 B1 | 4/2009 | Estakhri et al. | |
| 7,549,013 B2 | 6/2009 | Estakhri et al. | |
| 7,631,138 B2 | 12/2009 | Gonzalez | |
| 7,856,528 B1 | 12/2010 | Frost | |
| 2002/0053009 A1 | 5/2002 | Selkirk et al. | |
| 2003/0163630 A1 | 8/2003 | Aasheim et al. | |
| 2004/0107424 A1 | 6/2004 | Wang | |
| 2006/0059326 A1 | 3/2006 | Aasheim et al. | |
| 2006/0149902 A1 * | 7/2006 | Yun et al. | 711/118 |
| 2006/0248387 A1 | 11/2006 | Nicholson | |
| 2007/0086260 A1 | 4/2007 | Sinclair | |

(Continued)

FOREIGN PATENT DOCUMENTS

| | | |
|---|---|---|
| JP | 2009122850 | 6/2009 |
| WO | WO0201365 | 1/2002 |

(Continued)

OTHER PUBLICATIONS

WIPO, International Search Report and Written Opinion for PCT/US2012/021094, mailed Sep. 24, 2012.

(Continued)

*Primary Examiner* — Midys Rojas
(74) *Attorney, Agent, or Firm* — Stoel Rives LLP

(57) ABSTRACT

A cache layer leverages a logical address space and storage metadata of a storage layer (e.g., storage layer) to cache data of a backing store. The cache layer maintains access metadata to track data characteristics of logical identifiers in the logical address space, including accesses pertaining to data that is not in the cache. The access metadata may be separate and distinct from the storage metadata maintained by the storage layer. The cache layer determines whether to admit data into the cache using the access metadata. Data may be admitted into the cache when the data satisfies cache admission criteria, which may include an access threshold and/or a sequentiality metric. Time-ordered history of the access metadata is used to identify important/useful blocks in the logical address space of the backing store that would be beneficial to cache.

21 Claims, 16 Drawing Sheets

(56) References Cited

U.S. PATENT DOCUMENTS

| | | |
|---|---|---|
| 2007/0162830 A1 | 7/2007 | Stek et al. |
| 2007/0198770 A1 | 8/2007 | Horii et al. |
| 2007/0204128 A1 | 8/2007 | Lee et al. |
| 2007/0204197 A1 | 8/2007 | Yokokawa |
| 2007/0233937 A1 | 10/2007 | Coulson et al. |
| 2007/0245217 A1 | 10/2007 | Valle |
| 2007/0271572 A1 | 11/2007 | Gupta et al. |
| 2007/0274150 A1 | 11/2007 | Gorobets |
| 2008/0034153 A1 | 2/2008 | Lee et al. |
| 2008/0082812 A1 | 4/2008 | Kirshenbaum |
| 2008/0183965 A1 | 7/2008 | Shiga et al. |
| 2008/0201535 A1 | 8/2008 | Hara |
| 2008/0209090 A1 | 8/2008 | Kano et al. |
| 2008/0276040 A1 | 11/2008 | Moritoki |
| 2009/0043952 A1 | 2/2009 | Estakhri et al. |
| 2009/0070541 A1 | 3/2009 | Yochai |
| 2009/0083478 A1 | 3/2009 | Kunimatsu et al. |
| 2009/0083485 A1 | 3/2009 | Cheng |
| 2009/0089485 A1 | 4/2009 | Yeh |
| 2009/0125650 A1 | 5/2009 | Sebire |
| 2009/0144496 A1 | 6/2009 | Kawaguchi |
| 2009/0157956 A1 | 6/2009 | Kano |
| 2009/0204750 A1 | 8/2009 | Estakhri et al. |
| 2009/0228637 A1 | 9/2009 | Moon et al. |
| 2009/0235017 A1 | 9/2009 | Estakhri et al. |
| 2009/0276654 A1 | 11/2009 | Butterworth et al. |
| 2009/0300277 A1 | 12/2009 | Jeddeloh |
| 2009/0313453 A1 | 12/2009 | Stefanus et al. |
| 2009/0327602 A1 | 12/2009 | Moore et al. |
| 2009/0327804 A1 | 12/2009 | Moshayedi |
| 2010/0017556 A1 | 1/2010 | Chin et al. |
| 2010/0023674 A1 | 1/2010 | Aviles |
| 2010/0023676 A1 | 1/2010 | Moon et al. |
| 2010/0023682 A1 | 1/2010 | Lee et al. |
| 2010/0030946 A1 | 2/2010 | Kano et al. |
| 2010/0077194 A1 | 3/2010 | Zhao et al. |
| 2011/0161597 A1* | 6/2011 | Tremaine et al. ............. 711/133 |
| 2011/0258391 A1 | 10/2011 | Atkisson et al. |
| 2011/0258512 A1 | 10/2011 | Flynn et al. |
| 2013/0097367 A1* | 4/2013 | Flynn et al. ................... 711/103 |

FOREIGN PATENT DOCUMENTS

| | | |
|---|---|---|
| WO | WO2008000088 | 1/2008 |
| WO | WO2008070173 | 6/2008 |
| WO | WO2008073421 | 6/2008 |

OTHER PUBLICATIONS

EEEL 6892, "Virtual Computers, Lecture 18", http://www.acis.ufl.edu/~ming/lectures/eel6892lec18.pdf, visited Mar. 1, 2010.

Chen, "Hystor: Making SSDs the Survival of the Fittest in High Performance Storage Systems", Proceedings of 25th ACM International Conference on Supercomputing (ICS 2011), Tucson, Arizona, May 31-Jun. 4, 2011.

Cambridge Computer Services, Inc., 2008 ©, http://www.clusteredstorage.com/clustered_storage_solutions.html, visited Feb. 16, 2010.

Annonymous, "Method to Improve Reliability to SSD Arrays", http://ip.com, IP.com No. IPCOM000189338D, Nov. 5, 2009.

Stow: Spatially and Temporally Optimized Write Caching Algorithm, Gill, Ko, Debnath, Belluomini, http://www.usenix.org/event/usenix09/tech/slides/gill.pdf. Presented Usenix Nov. 2009. Accessed Apr. 2010.

Leventhal, "Flash Storage Memory, Communications of the ACM", http://arstechnica.com/hardware/news/2009/09/intels-new-flash-tech-to-bring-back-turbo-memory-for-real, ACM, vol. 51, No. 7, p. 47-51, Jul. 2008.

Stokes, Intel's New Flash Tech to Bring Back Turbo Memory, for Real, Sep. 2009, http://arstechnica.com/hardware/news/2009/09/intels-new-flash-tech-to-bring-back-turbo-memory-for-real.ars.

Wikipedia, "Adaptive Replacement Cache", last modified Jun. 25, 2012, http://en.wikipedia.org/wiki/Adaptive_replacement_cache.

Coburn, "NV-Heaps: Making Persistent Objects Fast and Safe with Next-Generation, Non-Volatile Memories", ACM 978-1-4503-0266-1/11/0, published Mar. 5, 2011.

Volos, "Mnemosyne: Lightweight Persistent Memory", ACM 978-1-4503-0266-1/11/03, published Mar. 5, 2011.

* cited by examiner

SYSTEMS AND METHODS FOR MANAGING CACHE ADMISSION

FIELD OF THE INVENTION

This disclosure relates to data storage and, more particularly, to managing admission to a cache using access metadata.

BACKGROUND

Cache devices may be used to improve the input/output performance of a computing system. A cache device may comprise a high-performance storage device, such as a volatile memory, non-volatile storage (e.g., Flash storage), or the like. Cache devices can be leveraged most effectively by selectively admitting frequently accessed data. A cache can be "poisoned" by admitting less-frequently accessed data. This less-frequently accessed data may consume the limited capacity of the cache to the exclusion of more frequently accessed data, which may obviate the performance benefits of the cache. What is needed, therefore, are systems and methods for managing cache admission to prevent cache poisoning by selectively admitting data into the cache based upon one or more cache admission criteria.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
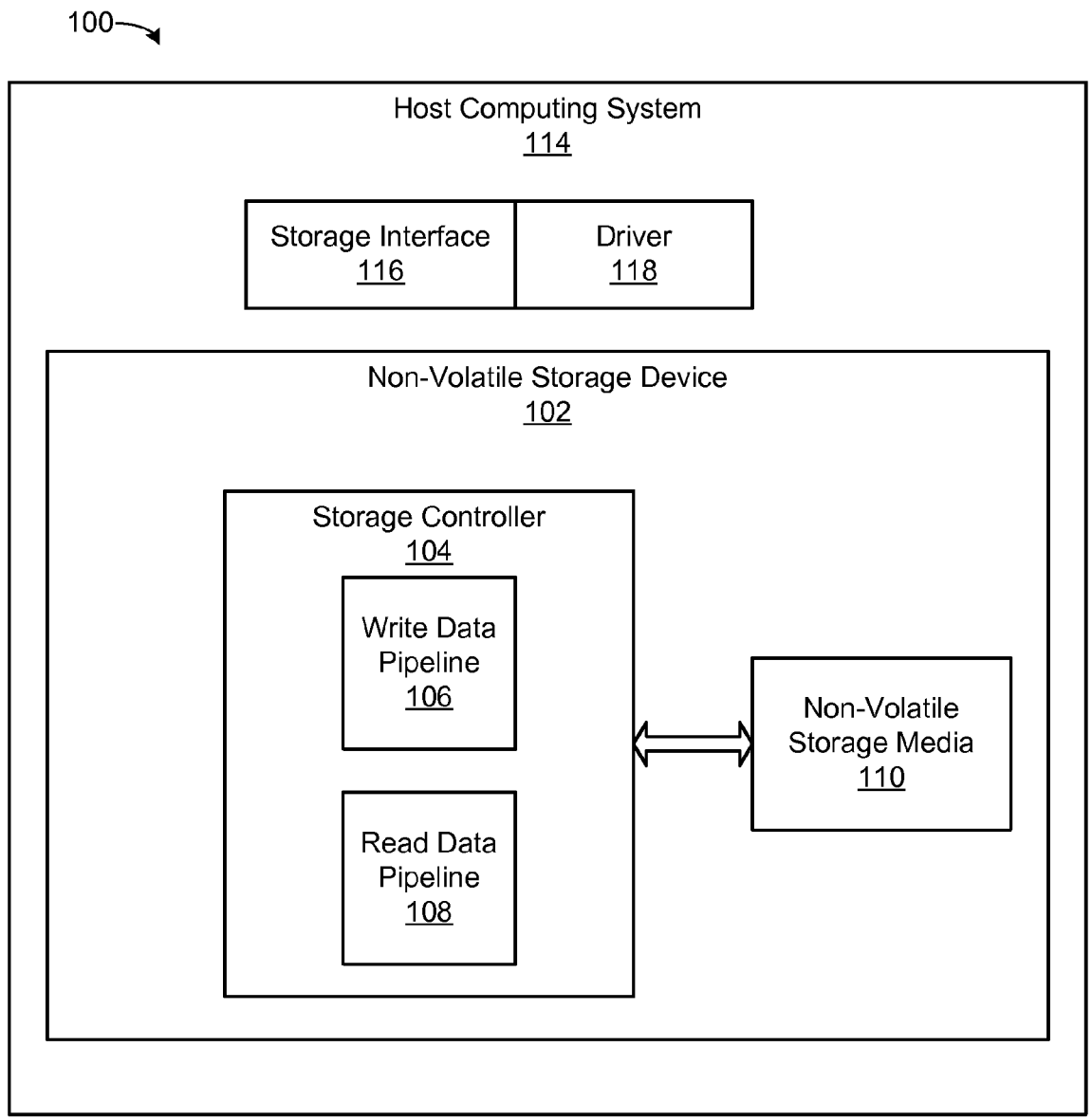
FIG. 1 is a block diagram of a system comprising a non-volatile storage device.

FIG. 1 depicts one embodiment of a system 100 comprising a non-volatile storage device 102. In the depicted embodiment, the system 100 includes a host computing system 114, a throughput management apparatus 122, and a storage device 102. The host computing system 114 may be a computer such as a server, laptop, desktop, a mobile device, or other computing device known in the art. The host computing system 114 typically includes components such as memory, processors, buses, and other components as known to those of skill in the art.

The host computing system 114 stores data in the storage device 102 and communicates data with the storage device 102 via a communications connection. The storage device 102 may be internal to the host computing system 114 or external to the host computing system 114. The communications connection may be a bus, a network, or other manner of connection allowing the transfer of data between the host computing system 114 and the storage device 102. In one embodiment, the storage device 102 is connected to the host computing system 114 by a PCI connection such as PCI express ("PCI-e"). The storage device 102 may be a card that plugs into a PCI-e connection on the host computing system 114.

The storage device 102, in the depicted embodiment, performs data storage operations such as reads, writes, erases, etc. In certain embodiments, a power connection and the communications connection for the storage device 102 are part of the same physical connection between the host computing system 114 and the storage device 102. For example, the storage device 102 may receive power over PCI, PCI-e, serial advanced technology attachment ("serial ATA" or "SATA"), parallel ATA ("PATA"), small computer system interface ("SCSI"), IEEE 1394 ("FireWire"), Fiber Channel, universal serial bus ("USB"), PCIe-AS, or another connection with the host computing system 114.

The storage device 102 provides nonvolatile storage for the host computing system 114. FIG. 1 shows the storage device 102 as a nonvolatile non-volatile storage device 102 comprising a storage controller 104, a write data pipeline 106, a read data pipeline 108, and nonvolatile non-volatile storage media 110. The storage device 102 may contain additional components that are not shown in order to provide a simpler view of the storage device 102.

The non-volatile storage media 110 stores data such that the data is retained even when the storage device 102 is not powered. In some embodiments, the non-volatile storage media 110 comprises a solid-state storage media, such as flash memory, nano random access memory ("NRAM"), magneto-resistive RAM ("MRAM"), dynamic RAM ("DRAM"), phase change RAM ("PRAM"), Racetrack memory, Memristor memory, nanocrystal wire-based memory, silicon-oxide based sub-10 nanometer process memory, graphene memory, Silicon-Oxide-Nitride-Oxide-Silicon ("SONOS"), Resistive random-access memory ("RRAM"), programmable metallization cell ("PMC"), conductive-bridging RAM ("CBRAM"), and the like. While, in the depicted embodiment, the storage device 102 includes non-volatile storage media 110, in other embodiments, the storage device 102 may include magnetic media such as hard disks, tape, and the like, optical media, or other nonvolatile data storage media. The storage device 102 also includes a storage controller 104 that coordinates the storage and retrieval of data in the non-volatile storage media 110. The storage controller 104 may use one or more indexes to locate and retrieve data, and perform other operations on data stored in the storage device 102. For example, the storage controller 104 may include a groomer for performing data grooming operations such as garbage collection.

As shown, the storage device 102, in certain embodiments, implements a write data pipeline 106 and a read data pipeline 108, an example of which is described in greater detail below. The write data pipeline 106 may perform certain operations on data as the data is transferred from the host computing system 114 into the non-volatile storage media 110. These operations may include, for example, error correction code (ECC) generation, encryption, compression, and others. The read data pipeline 108 may perform similar and potentially inverse operations on data that is being read out of non-volatile storage media 110 and sent to the host computing system 114.

In one embodiment, the host computing system 114 includes one or more other components in addition to the storage device 102, such as additional storage devices, graphics processors, network cards, and the like. Those of skill in the art, in view of this disclosure, will appreciate the different types of components that may be in a host computing system 114. The components may be internal or external to the host computing system 114. In one embodiment, some of the components may be PCI or PCI-e cards that connect to the host computing system 114 and receive power through the host computing system 114.

In some embodiments, the driver 118, or alternatively the storage interface 116, is an application program interface ("API") and acts to translate commands and other data to a form suitable to be sent to a storage controller 104. In another embodiment, the driver 118 includes one or more functions of the storage controller 104. For example, the driver 118 may include all or a portion of the modules described below and may include one or more indexes or maps for the storage devices 106. The driver 118, one or more storage controllers 104, and one or more storage devices 106 comprising the storage system 102 have a storage interface 116 connection to a file system/file server and allocation traditionally done in a file system/file server is advantageously pushed down (i.e., offloaded) to the storage system 102.

A logical identifier, as used in this application, is an identifier of a data unit that differs from a physical address where data of the data unit is stored. A data unit, as used in this application, is any set of data that is logically grouped together. A data unit may be a file, an object, a data segment of a redundant array of inexpensive/independent disks/drives ("RAID") data stripe, or other data set used in data storage. The data unit may be executable code, data, metadata, directories, indexes, any other type of data that may be stored in a memory device, or a combination thereof. The data unit may be identified by a name, by a logical address, a physical address, an address range, or other convention for identifying data units. A logical identifier includes data unit identifiers, such as a file name, an object identifier, an inode, Universally Unique Identifier ("UUID"), Globally Unique Identifier ("GUID"), or other data unit label, and may also include a logical block address ("LBA"), cylinder/head/sector ("CHS"), or other lower level logical identifier. A logical identifier generally includes any logical label that can be mapped to a physical location.

In some embodiment, the storage device 106 stores data in a sequential log-based format on the non-volatile storage media 110. For example, when a data unit is modified, data of the data unit is read from one physical storage location, modified, and then written to a different physical storage location. The order and sequence of writing data to the data storage device 106 may comprise an event log of the sequence of storage operations performed on the non-volatile storage device 102. By traversing the event log (and/or replaying the sequence of storage operations), and storage metadata, such as a forward index can be constructed or reconstructed.

In a typical random access device, logical identifiers have almost a one-to-one correspondence to physical addresses of the random access device. This one-to-one mapping in a typical random access device (excluding a small number of physical addresses on the random access device reserved for bad block mapping) also correlates to a near one-to-one relationship between storage capacity associated with logical identifiers and physical capacity associated with physical addresses. For example, if a logical identifier is a logical block address ("LBA"), each logical block associated with an LBA has a fixed size. A corresponding physical block on the random access device is typically the same size as a logical block. This enables a typical file server 114/file system to manage physical capacity on the random access device by managing logical identifiers, such as LBAs. This continuity of LBA to PBA mapping is generally depended upon and utilized by file systems to defragment the data stored on the data storage device. Similarly, some systems may use this continuity to locate the data on specific physical tracks to improve performance as is the case of a technique called "short stroking" the disk drive. The highly predictable LBA to PBA mapping is essential in certain applications to indirectly manage the storage of the data in the physical storage space through direct management of the logical address space.

However, the storage system 102 may be a log structured file system such that there is no "fixed" relationship or algorithm to determine the mapping of the LBA to the PBA, or in another embodiment, may be random access, but may be accessed by more than one client 110 or file server 114/file system such that the logical identifiers allocated to each client 110 or file server 114/file system represent a storage capacity much larger than the one-to-one relationship of logical to physical identifiers of typical systems. The storage system 102 may also be thinly provisioned such that one or more clients 110 each has an allocated logical address range that is much larger than the storage capacity of the storage devices 106 in the storage system 102. In the system 100, the storage system 102 manages and allocates logical identifiers such that there is no pre-determined one-to-one or near one-to-one relationship between logical identifiers and physical identifiers.

The system 100 is advantageous because it allows more efficient management of storage capacity than typical storage systems. For example, for typical random access devices accessible by a number of clients 110, if each client is allocated a certain amount storage space, the storage space typically will exist and be tied up in the allocations even if the actual amount of storage space occupied is much less. The system 100 is also advantageous because the system 100 reduces complexity of standard thin provisioning systems connected to storage devices 106. A standard thin provisioning system has a thin provisioning layer comprising a logical-to-logical mapping between logical identifiers in the space logical address space and physical storage locations. The system 100 is more efficient because multiple layers of mapping are eliminated and thin provisioning (logical-to-physical mapping) is done at the lowest level.

Figure 2:
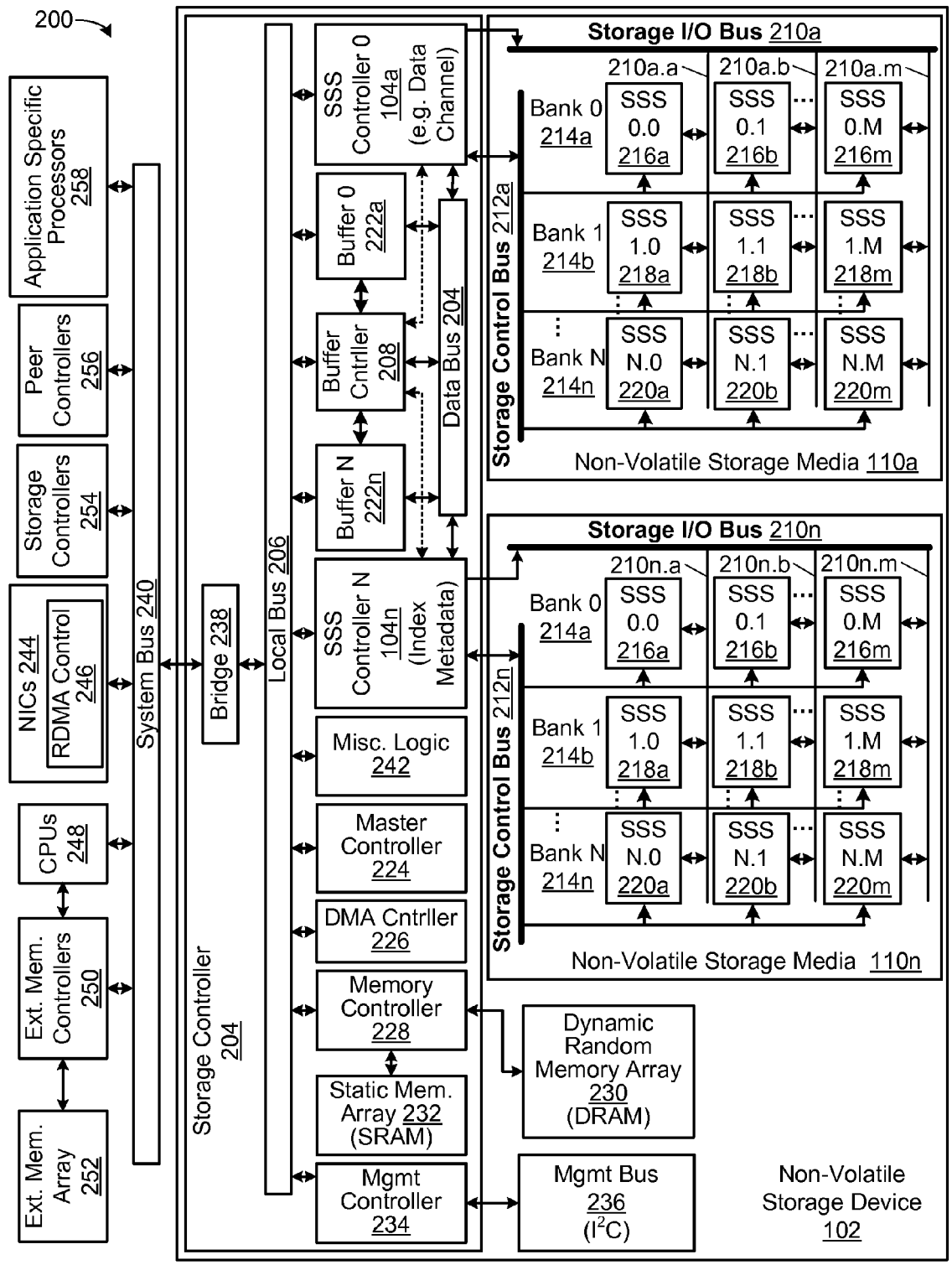
FIG. 2 is a block diagram of one embodiment of a non-volatile storage device.

FIG. 2 is a schematic block diagram illustrating one embodiment 200 of a non-volatile storage device controller 202 that includes a write data pipeline 106 and a read data pipeline 108 in a non-volatile storage device 102 in accordance with the present invention. The non-volatile storage device controller 202 may include a number of storage controllers 0-N 104a-n, each controlling non-volatile storage media 110. In the depicted embodiment, two non-volatile controllers are shown: non-volatile controller 0 104a and storage controller N 104n, and each controlling respective non-volatile storage media 110a-n. In the depicted embodiment, storage controller 0 104a controls a data channel so that the attached non-volatile storage media 110a stores data. Storage controller N 104n controls an index metadata channel associated with the stored data and the associated non-volatile storage media 110n stores index metadata. In an alternate embodiment, the non-volatile storage device controller 202 includes a single non-volatile controller 104a with a single non-volatile storage media 110a. In another embodiment, there are a plurality of storage controllers 104a-n and associated non-volatile storage media 110a-n. In one embodiment, one or more non-volatile controllers 104a-104n−1, coupled to their associated non-volatile storage media 110a-110n−1, control data while at least one storage controller 104n, coupled to its associated non-volatile storage media 110n, controls index metadata.

In one embodiment, at least one non-volatile controller 104 is a field-programmable gate array ("FPGA") and controller functions are programmed into the FPGA. In a particular embodiment, the FPGA is a Xilinx® FPGA. In another embodiment, the storage controller 104 comprises components specifically designed as a storage controller 104, such as an application-specific integrated circuit ("ASIC") or custom logic solution. Each storage controller 104 typically includes a write data pipeline 106 and a read data pipeline 108, which are describe further in relation to FIG. 3. In another embodiment, at least one storage controller 104 is made up of a combination FPGA, ASIC, and custom logic components.

The non-volatile storage media 110 is an array of non-volatile storage elements 216, 218, 220, arranged in banks 214, and accessed in parallel through a bi-directional storage input/output ("I/O") bus 210. The storage I/O bus 210, in one embodiment, is capable of unidirectional communication at any one time. For example, when data is being written to the non-volatile storage media 110, data cannot be read from the non-volatile storage media 110. In another embodiment, data can flow both directions simultaneously. However bi-directional, as used herein with respect to a data bus, refers to a data pathway that can have data flowing in only one direction at a time, but when data flowing one direction on the bi-directional data bus is stopped, data can flow in the opposite direction on the bi-directional data bus.

A non-volatile storage element (e.g., SSS 0.0 216a) is typically configured as a chip (a package of one or more dies) or a die on a circuit board. As depicted, a non-volatile storage element (e.g., 216a) operates independently or semi-independently of other non-volatile storage elements (e.g., 218a) even if these several elements are packaged together in a chip package, a stack of chip packages, or some other package element. As depicted, a row of non-volatile storage elements 216a, 216b, 216m is designated as a bank 214. As depicted, there may be "n" banks 214a-n and "m" non-volatile storage elements 216a-m, 218a-m, 220a-m per bank in an array of n×m non-volatile storage elements 216, 218, 220 in a non-volatile storage media 110. Of course, different embodiments may include different values for n and m. In one embodiment, a non-volatile storage media 110a includes twenty non-volatile storage elements 216a-216m per bank 214 with eight banks 214. In one embodiment, the non-volatile storage media 110a includes twenty-four non-volatile storage elements 216a-216m per bank 214 with eight banks 214. In addition to the n×m storage elements 216a-216m, 218a-218m, 220a-220m, one or more additional columns (P) may also be addressed and operated in parallel with other non-volatile storage elements 216a, 216b, 216m for one or more rows. The added P columns in one embodiment, store parity data for the portions of an ECC chunk (i.e., an ECC codeword) that span m storage elements for a particular bank. In one embodiment, each non-volatile storage element 216, 218, 220 is comprised of single-level cell ("SLC") devices. In another embodiment, each non-volatile storage element 216, 218, 220 is comprised of multi-level cell ("MLC") devices.

In one embodiment, non-volatile storage elements that share a common line 211 on the storage I/O bus 210a (e.g., 216b, 218b, 220b) are packaged together. In one embodiment, a non-volatile storage element 216, 218, 220 may have one or more dies per package with one or more packages stacked vertically and each die may be accessed independently. In another embodiment, a non-volatile storage element (e.g., SSS 0.0 216a) may have one or more virtual dies per die and one or more dies per package and one or more packages stacked vertically and each virtual die may be accessed independently. In another embodiment, a non-volatile storage element SSS 0.0 216a may have one or more virtual dies per die and one or more dies per package with some or all of the one or more dies stacked vertically and each virtual die may be accessed independently.

In one embodiment, two dies are stacked vertically with four stacks per group to form eight storage elements (e.g., SSS 0.0-SSS 8.0) 216a, 218a . . . 220a, each in a separate bank 214a, 214b . . . 214n. In another embodiment, 24 storage elements (e.g., SSS 0.0-SSS 0.24) 216a, 216b, . . . 216m form a logical bank 214a so that each of the eight logical banks has 24 storage elements (e.g., SSS0.0-SSS 8.24) 216, 218, 220. Data is sent to the non-volatile storage media 110 over the storage I/O bus 210 to all storage elements of a particular group of storage elements (SSS 0.0-SSS 8.0) 216a, 218a, 220a. The storage control bus 212a is used to select a particular bank (e.g., Bank 0 214a) so that the data received over the storage I/O bus 210 connected to all banks 214 is written just to the selected bank 214a.

In one embodiment, the storage I/O bus 210 is comprised of one or more independent I/O buses ("IIOBa-m" comprising 210a.a-m . . . 210n.a-m) wherein the non-volatile storage elements within each column share one of the independent I/O buses that are connected to each non-volatile storage element 216, 218, 220 in parallel. For example, one independent I/O bus 210a.a of the storage I/O bus 210a may be physically connected to a first non-volatile storage element 216a, 218a, 220a of each bank 214a-n. A second independent I/O bus 210a.b of the storage I/O bus 210b may be physically connected to a second non-volatile storage element 216b, 218b, 220b of each bank 214a-n. Each non-volatile storage element 216a, 216b, 216m in a bank 214a (a row of non-volatile storage elements as illustrated in FIG. 2) may be accessed simultaneously and/or in parallel. In one embodiment, where non-volatile storage elements 216, 218, 220 comprise stacked packages of dies, all packages in a particular stack are physically connected to the same independent I/O bus. As used herein, "simultaneously" also includes near simultaneous access where devices are accessed at slightly different intervals to avoid switching noise. Simultaneously is used in this context to be distinguished from a sequential or serial access wherein commands and/or data are sent individually one after the other.

Typically, banks 214a-n are independently selected using the storage control bus 212. In one embodiment, a bank 214 is selected using a chip enable or chip select. Where both chip select and chip enable are available, the storage control bus 212 may select one package within a stack of packages. In other embodiments, other commands are used by the storage control bus 212 to individually select one package within a stack of packages. Non-volatile storage elements 216, 218, 220 may also be selected through a combination of control signals and address information transmitted on storage I/O bus 210 and the storage control bus 212.

In one embodiment, each non-volatile storage element 216, 218, 220 is partitioned into erase blocks and each erase block is partitioned into pages. An erase block on a non-volatile storage element 216, 218 220 may be called a physical erase block or "PEB." A typical page is 2048 bytes ("2 kB"). In one example, a non-volatile storage element (e.g., SSS 0.0) includes two registers and can program two pages so that a two-register non-volatile storage element 216, 218, 220 has a capacity of 4 kB. A bank 214 of 20 non-volatile storage elements 216a, 216b, 216m would then have an 80 kB capacity of pages accessed with the same address going out the independent I/O buses of the storage I/O bus 210.

This group of pages in a bank 214 of non-volatile storage elements 216a, 216b, . . . 216m of 80 kB may be called a logical page or virtual page. Similarly, an erase block of each storage element 216a, 216b, . . . 216m of a bank 214a may be grouped to form a logical erase block (which may also be called a virtual erase block). In one embodiment, an erase block of pages within a non-volatile storage element is erased when an erase command is received within the non-volatile storage element. Whereas the size and number of erase blocks, pages, planes, or other logical and physical divisions within a non-volatile storage element 216, 218, 220 are expected to change over time with advancements in technology, it is to be expected that many embodiments consistent with new configurations are possible and are consistent with the general description herein.

Typically, when a packet is written to a particular location within a non-volatile storage element 216, wherein the packet is intended to be written to a location within a particular page which is specific to a particular physical erase block of a particular storage element of a particular bank, a physical address is sent on the storage I/O bus 210 and is followed by the packet. The physical address contains enough information for the non-volatile storage element 216 to direct the packet to the designated location within the page. Since all storage elements in a column of storage elements (e.g., SSS 0.0-SSS N.0 216a, 218a, . . . 220a) are connected to the same independent I/O bus (e.g., 210.a.a) of the storage I/O bus 210a, to reach the proper page and to avoid writing the data packet to similarly addressed pages in the column of storage elements (SSS 0.0-SSS N.0 216a, 218a, . . . 220a), the bank 214a that includes the non-volatile storage element SSS 0.0 216a with the correct page where the data packet is to be written is selected by the storage control bus 212a and other banks 214b . . . 214n of the non-volatile storage 110a are deselected.

Similarly, satisfying a read command on the storage I/O bus 210 requires a signal on the storage control bus 212 to select a single bank 214a and the appropriate page within that bank 214a. In one embodiment, a read command reads an entire page, and because there are multiple non-volatile storage elements 216a, 216b, . . . 216m in parallel in a bank 214a, an entire logical page is read with a read command. However, the read command may be broken into subcommands, as will be explained below with respect to bank interleave. Similarly, an entire logical page may be written to the non-volatile storage elements 216a, 216b, . . . 216m of a bank 214a in a write operation.

An erase block erase command may be sent out to erase an erase block over the storage I/O bus 210 with a particular erase block address to erase a particular erase block. Typically, storage controller 104a may send an erase block erase command over the parallel paths (independent I/O buses 210a-n.a-m) of the storage I/O bus 210 to erase a logical erase block, each with a particular erase block address to erase a particular erase block. Simultaneously, a particular bank (e.g., Bank 0 214a) is selected over the storage control bus 212 to prevent erasure of similarly addressed erase blocks in non-selected banks (e.g., Banks 1-N 214b-n). Alternatively, no particular bank (e.g., Bank 0 214a) is selected over the storage control bus 212 (or all of the banks are selected) to enable erasure of similarly addressed erase blocks in all of the banks (Banks 1-N 214b-n) in parallel. Other commands may also be sent to a particular location using a combination of the storage I/O bus 210 and the storage control bus 212. One of skill in the art will recognize other ways to select a particular storage location using the bi-directional storage I/O bus 210 and the storage control bus 212.

In one embodiment, packets are written sequentially to the non-volatile storage media 110. For example, storage controller 104a streams packets to storage write buffers of a bank 214a of storage elements 216 and, when the buffers are full, the packets are programmed to a designated logical page. Storage controller 104a then refills the storage write buffers with packets and, when full, the packets are written to the next logical page. The next logical page may be in the same bank 214a or another bank (e.g., 214b). This process continues, logical page after logical page, typically until a logical erase block is filled. In another embodiment, the streaming may continue across logical erase block boundaries with the process continuing, logical erase block after logical erase block.

In a read, modify, write operation, data packets associated with requested data are located and read in a read operation. Data segments of the modified requested data that have been modified are not written to the location from which they are read. Instead, the modified data segments are again converted to data packets and then written sequentially to the next available location in the logical page currently being written. The index entries for the respective data packets are modified to point to the packets that contain the modified data segments. The entry or entries in the index for data packets associated with the same requested data that have not been modified will include pointers to original location of the unmodified data packets. Thus, if the original requested data is maintained, for example to maintain a previous version of the requested data, the original requested data will have pointers in the index to all data packets as originally written. The new requested data will have pointers in the index to some of the original data packets and pointers to the modified data packets in the logical page that is currently being written.

In a copy operation, the index includes an entry for the original requested data mapped to a number of packets stored in the non-volatile storage media 110. When a copy is made, a new copy of the requested data is created and a new entry is created in the index mapping the new copy of the requested data to the original packets. The new copy of the requested data is also written to the non-volatile storage media 110 with its location mapped to the new entry in the index. The new copy of the requested data packets may be used to identify the packets within the original requested data that are referenced in case changes have been made in the original requested data that have not been propagated to the copy of the requested data and the index is lost or corrupted.

Beneficially, sequentially writing packets facilitates a more even use of the non-volatile storage media 110 and allows the solid-storage device controller 202 to monitor storage hot spots and level usage of the various logical pages in the non-volatile storage media 110. Sequentially writing packets also facilitates a powerful, efficient garbage collection system, which is described in detail below. One of skill in the art will recognize other benefits of sequential storage of data packets.

In various embodiments, the non-volatile storage device controller 202 also includes a data bus 204, a local bus 206, a buffer controller 208, buffers 0-N 222a-n, a master controller 224, a direct memory access ("DMA") controller 226, a memory controller 228, a dynamic memory array 230, a static random memory array 232, a management controller 234, a management bus 236, a bridge 238 to a system bus 240, and miscellaneous logic 242, which are described below. In other embodiments, the system bus 240 is coupled to one or more network interface cards ("NICs") 244, some of which may include remote DMA ("RDMA") controllers 246, one or more central processing unit ("CPU") 248, one or more external memory controllers 250 and associated external memory arrays 252, one or more storage controllers 254, peer controllers 256, and application specific processors 258, which are described below. The components 244-258 connected to the system bus 240 may be located in the host computing system 114 or may be other devices.

Typically, the storage controller(s) 104 communicate data to the non-volatile storage media 110 over a storage I/O bus 210. In a typical embodiment where the non-volatile storage is arranged in banks 214 and each bank 214 includes multiple storage elements 216a, 216b, 216m accessed in parallel, the storage I/O bus 210 is an array of busses, one for each column of storage elements 216, 218, 220 spanning the banks 214. As used herein, the term "storage I/O bus" may refer to one storage I/O bus 210 or an array of independent data busses wherein individual data busses of the array independently communicate different data relative to one another. In one embodiment, each storage I/O bus 210 accessing a column of storage elements (e.g., 216a, 218a, 220a) may include a logical-to-physical mapping for storage divisions (e.g., erase blocks) accessed in a column of storage elements 216a, 218a, 220a. This mapping (or bad block remapping) allows a logical address mapped to a physical address of a storage division to be remapped to a different storage division if the first storage division fails, partially fails, is inaccessible, or has some other problem.

Data may also be communicated to the storage controller(s) 104 from a requesting device 155 through the system bus 240, bridge 238, local bus 206, buffer(s) 222, and finally over a data bus 204. The data bus 204 typically is connected to one or more buffers 222a-n controlled with a buffer controller 208. The buffer controller 208 typically controls transfer of data from the local bus 206 to the buffers 222 and through the data bus 204 to the pipeline input buffer 306 and output buffer 330. The buffer controller 208 typically controls how data arriving from a requesting device can be temporarily stored in a buffer 222 and then transferred onto a data bus 204, or vice versa, to account for different clock domains, to prevent data collisions, etc. The buffer controller 208 typically works in conjunction with the master controller 224 to coordinate data flow. As data arrives, the data will arrive on the system bus 240, be transferred to the local bus 206 through a bridge 238.

Typically, the data is transferred from the local bus 206 to one or more data buffers 222 as directed by the master controller 224 and the buffer controller 208. The data then flows out of the buffer(s) 222 to the data bus 204, through a non-volatile controller 104, and on to the non-volatile storage media 110 such as NAND flash or other storage media. In one embodiment, data and associated out-of-band metadata ("metadata") arriving with the data is communicated using one or more data channels comprising one or more storage controllers 104a-104n-1 and associated non-volatile storage media 110a-110n-1 while at least one channel (storage controller 104n, non-volatile storage media 110n) is dedicated to in-band metadata, such as index information and other metadata generated internally to the non-volatile storage device 102.

The local bus 206 is typically a bidirectional bus or set of busses that allows for communication of data and commands between devices internal to the non-volatile storage device controller 202 and between devices internal to the non-volatile storage device 102 and devices 244-258 connected to the system bus 240. The bridge 238 facilitates communication between the local bus 206 and system bus 240. One of skill in the art will recognize other embodiments such as ring structures or switched star configurations and functions of buses 240, 206, 204, 210 and bridges 238.

The system bus 240 is typically a bus of a host computing system 114 or other device in which the non-volatile storage device 102 is installed or connected. In one embodiment, the system bus 240 may be a PCI-e bus, a Serial Advanced Technology Attachment ("serial ATA") bus, parallel ATA, or the like. In another embodiment, the system bus 240 is an external bus such as small computer system interface ("SCSI"), FireWire, Fiber Channel, USB, PCIe-AS, or the like. The non-volatile storage device 102 may be packaged to fit internally to a device or as an externally connected device.

The non-volatile storage device controller 202 includes a master controller 224 that controls higher-level functions within the non-volatile storage device 102. The master controller 224, in various embodiments, controls data flow by interpreting object requests and other requests, directs creation of indexes to map object identifiers associated with data to physical locations of associated data, coordinating DMA requests, etc. Many of the functions described herein are controlled wholly or in part by the master controller 224.

In one embodiment, the master controller 224 uses embedded controller(s). In another embodiment, the master controller 224 uses local memory such as a dynamic memory array 230 (dynamic random access memory "DRAM"), a static memory array 232 (static random access memory "SRAM"), etc. In one embodiment, the local memory is controlled using the master controller 224. In another embodiment, the master controller 224 accesses the local memory via a memory controller 228. In another embodiment, the master controller 224 runs a Linux server and may support various common server interfaces, such as the World Wide Web, hyper-text markup language ("HTML"), etc. In another embodiment, the master controller 224 uses a nano-processor. The master controller 224 may be constructed using programmable or standard logic, or any combination of controller types listed above. One skilled in the art will recognize many embodiments for the master controller 224.

In one embodiment, where the storage device/non-volatile storage device controller 202 manages multiple data storage devices/non-volatile storage media 110a-n, the master controller 224 divides the work load among internal controllers, such as the storage controllers 104a-n. For example, the master controller 224 may divide an object to be written to the data storage devices (e.g., non-volatile storage media 110a-n) so that a portion of the object is stored on each of the attached data storage devices. This feature is a performance enhancement allowing quicker storage and access to an object. In one embodiment, the master controller 224 is implemented using an FPGA. In another embodiment, the firmware within the master controller 224 may be updated through the management bus 236, the system bus 240 over a network connected to a NIC 244 or other device connected to the system bus 240.

In one embodiment, the master controller 224, which manages objects, emulates block storage such that a host computing system 114 or other device connected to the storage device/non-volatile storage device 102 views the storage device/non-volatile storage device 102 as a block storage device and sends data to specific physical addresses in the storage device/non-volatile storage device 102. The master controller 224 then divides up the blocks and stores the data blocks as it would objects. The master controller 224 then maps the blocks and physical address sent with the block to the actual locations determined by the master controller 224. The mapping is stored in the object index. Typically, for block emulation, a block device application program interface ("API") is provided in a driver in a computer such as the host computing system 114, or other device wishing to use the storage device/non-volatile storage device 102 as a block storage device.

In another embodiment, the master controller 224 coordinates with NIC controllers 244 and embedded RDMA controllers 246 to deliver just-in-time RDMA transfers of data and command sets. NIC controller 244 may be hidden behind a non-transparent port to enable the use of custom drivers. Also, a driver on a host computing system 114 may have access to the computer network 116 through an I/O memory driver using a standard stack API and operating in conjunction with NICs 244.

In one embodiment, the master controller 224 is also a redundant array of independent drive ("RAID") controller. Where the data storage device/non-volatile storage device 102 is networked with one or more other data storage devices/non-volatile storage devices 102, the master controller 224 may be a RAID controller for single tier RAID, multi-tier RAID, progressive RAID, etc. The master controller 224 also allows some objects to be stored in a RAID array and other objects to be stored without RAID. In another embodiment, the master controller 224 may be a distributed RAID controller element. In another embodiment, the master controller 224 may comprise many RAID, distributed RAID, and other functions as described elsewhere. In one embodiment, the master controller 224 controls storage of data in a RAID-like structure where parity information is stored in one or more storage elements 216, 218, 220 of a logical page where the parity information protects data stored in the other storage elements 216, 218, 220 of the same logical page.

In one embodiment, the master controller 224 coordinates with single or redundant network managers (e.g., switches) to establish routing, to balance bandwidth utilization, failover, etc. In another embodiment, the master controller 224 coordinates with integrated application specific logic (via local bus 206) and associated driver software. In another embodiment, the master controller 224 coordinates with attached application specific processors 258 or logic (via the external system bus 240) and associated driver software. In another embodiment, the master controller 224 coordinates with remote application specific logic (via the computer network 116) and associated driver software. In another embodiment, the master controller 224 coordinates with the local bus 206 or external bus attached hard disk drive ("HDD") storage controller.

In one embodiment, the master controller 224 communicates with one or more storage controllers 254 where the storage device/non-volatile storage device 102 may appear as a storage device connected through a SCSI bus, Internet SCSI ("iSCSI"), fiber channel, etc. Meanwhile the storage device/non-volatile storage device 102 may autonomously manage objects and may appear as an object file system or distributed object file system. The master controller 224 may also be accessed by peer controllers 256 and/or application specific processors 258.

In another embodiment, the master controller 224 coordinates with an autonomous integrated management controller to periodically validate FPGA code and/or controller software, validate FPGA code while running (reset) and/or validate controller software during power on (reset), support external reset requests, support reset requests due to watchdog timeouts, and support voltage, current, power, temperature, and other environmental measurements and setting of threshold interrupts. In another embodiment, the master controller 224 manages garbage collection to free erase blocks for reuse. In another embodiment, the master controller 224 manages wear leveling. In another embodiment, the master controller 224 allows the data storage device/non-volatile storage device 102 to be partitioned into multiple logical devices and allows partition-based media encryption. In yet another embodiment, the master controller 224 supports a storage controller 104 with advanced, multi-bit ECC correction. One of skill in the art will recognize other features and functions of a master controller 224 in a storage controller 202, or more specifically in a non-volatile storage device 102.

In one embodiment, the non-volatile storage device controller 202 includes a memory controller 228, which controls a dynamic random memory array 230 and/or a static random memory array 232. As stated above, the memory controller 228 may be independent or integrated with the master controller 224. The memory controller 228 typically controls volatile memory of some type, such as DRAM (dynamic random memory array 230) and SRAM (static random memory array 232). In other examples, the memory controller 228 also controls other memory types such as electrically erasable programmable read only memory ("EEPROM"), etc. In other embodiments, the memory controller 228 controls two or more memory types and the memory controller 228 may include more than one controller. Typically, the memory controller 228 controls as much SRAM 232 as is feasible and by DRAM 230 to supplement the SRAM 232.

In one embodiment, the object index is stored in memory 230, 232 and then periodically off-loaded to a channel of the non-volatile storage media 110n or other non-volatile memory. One of skill in the art will recognize other uses and configurations of the memory controller 228, dynamic memory array 230, and static memory array 232.

In one embodiment, the non-volatile storage device controller 202 includes a DMA controller 226 that controls DMA operations between the storage device/non-volatile storage device 102 and one or more external memory controllers 250 and associated external memory arrays 252 and CPUs 248. Note that the external memory controllers 250 and external memory arrays 252 are called external because they are external to the storage device/non-volatile storage device 102. In addition, the DMA controller 226 may also control RDMA operations with requesting devices through a NIC 244 and associated RDMA controller 246.

In one embodiment, the non-volatile storage device controller 202 includes a management controller 234 connected to a management bus 236. Typically, the management controller 234 manages environmental metrics and status of the storage device/non-volatile storage device 102. The management controller 234 may monitor device temperature, fan speed, power supply settings, etc. over the management bus 236. The management controller 234 may support the reading and programming of erasable programmable read only memory ("EEPROM") for storage of FPGA code and controller software. Typically, the management bus 236 is connected to the various components within the storage device/non-volatile storage device 102. The management controller 234 may communicate alerts, interrupts, etc. over the local bus 206 or may include a separate connection to a system bus 240 or other bus. In one embodiment, the management bus 236 is an Inter-Integrated Circuit ("I2C") bus. One of skill in the art will recognize other related functions and uses of a management controller 234 connected to components of the storage device/non-volatile storage device 102 by a management bus 236.

In one embodiment, the non-volatile storage device controller 202 includes miscellaneous logic 242 that may be customized for a specific application. Typically, where the non-volatile device controller 202 or master controller 224 is/are configured using a FPGA or other configurable controller, custom logic may be included based on a particular application, customer requirement, storage requirement, etc.

Figure 3:
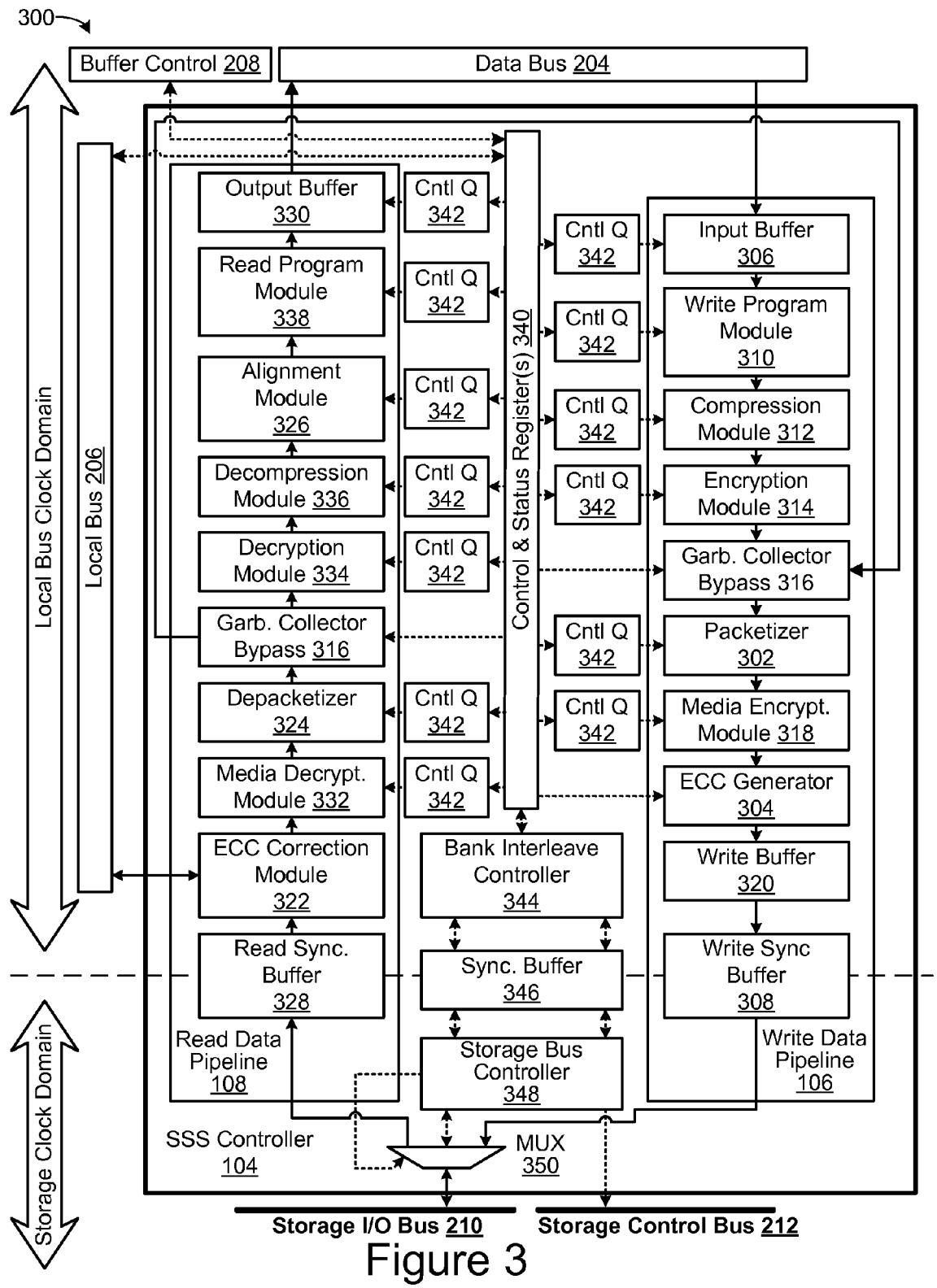
FIG. 3 is a block diagram of one embodiment of a storage controller comprising a write data pipeline and a read data pipeline.

FIG. 3 is a schematic block diagram illustrating one embodiment 300 of a storage controller 104 with a write data pipeline 106, a read data pipeline 108 and a throughput management apparatus 122 in a non-volatile storage device 102 in accordance with the present invention. The embodiment 300 includes a data bus 204, a local bus 206, and buffer control 208, which are substantially similar to those described in relation to the non-volatile storage device controller 202 of FIG. 2. The write data pipeline 106 includes a packetizer 302 and an error-correcting code ("ECC") generator 304. In other embodiments, the write data pipeline 106 includes an input buffer 306, a write synchronization buffer 308, a write program module 310, a compression module 312, an encryption module 314, a garbage collector bypass 316 (with a portion within the read data pipeline 108), a media encryption module 318, and a write buffer 320. The read data pipeline 108 includes a read synchronization buffer 328, an ECC correction module 322, a depacketizer 324, an alignment module 326, and an output buffer 330. In other embodiments, the read data pipeline 108 may include a media decryption module 332, a portion of the garbage collector bypass 316, a decryption module 334, a decompression module 336, and a read program module 338. The storage controller 104 may also include control and status registers 340 and control queues 342, a bank interleave controller 344, a synchronization buffer 346, a storage bus controller 348, and a multiplexer ("MUX") 350. The components of the non-volatile controller 104 and associated write data pipeline 106 and read data pipeline 108 are described below. In other embodiments, synchronous non-volatile storage media 110 may be used and synchronization buffers 308 328 may be eliminated.

The write data pipeline 106 includes a packetizer 302 that receives a data or metadata segment to be written to the non-volatile storage, either directly or indirectly through another write data pipeline 106 stage, and creates one or more packets sized for the non-volatile storage media 110. The data or metadata segment is typically part of a data structure such as an object, but may also include an entire data structure. In another embodiment, the data segment is part of a block of data, but may also include an entire block of data. Typically, a set of data such as a data structure is received from a computer such as the host computing system 114, or other computer or device and is transmitted to the non-volatile storage device 102 in data segments streamed to the non-volatile storage device 102. A data segment may also be known by another name, such as data parcel, but as referenced herein includes all or a portion of a data structure or data block.

Each data structure is stored as one or more packets. Each data structure may have one or more container packets. Each packet contains a header. The header may include a header type field. Type fields may include data, attribute, metadata, data segment delimiters (multi-packet), data structures, data linkages, and the like. The header may also include information regarding the size of the packet, such as the number of bytes of data included in the packet. The length of the packet may be established by the packet type. The header may include information that establishes the relationship of the packet to a data structure. An example might be the use of an offset in a data packet header to identify the location of the data segment within the data structure. One of skill in the art will recognize other information that may be included in a header added to data by a packetizer 302 and other information that may be added to a data packet.

Each packet includes a header and possibly data from the data or metadata segment. The header of each packet includes pertinent information to relate the packet to the data structure to which the packet belongs. For example, the header may include an object identifier or other data structure identifier and offset that indicate the data segment, object, data structure or data block from which the data packet was formed. The header may also include a logical address used by the storage bus controller 348 to store the packet. The header may also include information regarding the size of the packet, such as the number of bytes included in the packet. The header may also include a sequence number that identifies where the data segment belongs with respect to other packets within the data structure when reconstructing the data segment or data structure. The header may include a header type field. Type fields may include data, data structure attributes, metadata, data segment delimiters (multi-packet), data structure types, data structure linkages, and the like. One of skill in the art will recognize other information that may be included in a header added to data or metadata by a packetizer 302 and other information that may be added to a packet.

The write data pipeline 106 includes an ECC generator 304 that that generates one or more error-correcting codes ("ECC") for the one or more packets received from the packetizer 302. The ECC generator 304 typically uses an error-correcting algorithm to generate ECC check bits, which are stored with the one or more data packets. The ECC codes generated by the ECC generator 304 together with the one or more data packets associated with the ECC codes comprise an ECC chunk. The ECC data stored with the one or more data packets is used to detect and to correct errors introduced into the data through transmission and storage. In one embodiment, packets are streamed into the ECC generator 304 as un-encoded blocks of length N. A syndrome of length S is calculated, appended, and output as an encoded block of length N+S. The value of N and S are dependent upon the characteristics of the ECC algorithm, which is selected to achieve specific performance, efficiency, and robustness metrics. In one embodiment, there is no fixed relationship between the ECC blocks and the packets; the packet may comprise more than one ECC block; the ECC block may comprise more than one packet; and a first packet may end anywhere within the ECC block and a second packet may begin after the end of the first packet within the same ECC block. In one embodiment, ECC algorithms are not dynamically modified. In one embodiment, the ECC data stored with the data packets is robust enough to correct errors in more than two bits.

Beneficially, using a robust ECC algorithm allowing more than single bit correction or even double bit correction allows the life of the non-volatile storage media 110 to be extended. For example, if flash memory is used as the storage medium in the non-volatile storage media 110, the flash memory may be written approximately 100,000 times without error per erase cycle. This usage limit may be extended using a robust ECC algorithm. Having the ECC generator 304 and corresponding ECC correction module 322 onboard the non-volatile storage device 102, the non-volatile storage device 102 can internally correct errors and has a longer useful life than if a less robust ECC algorithm is used, such as single bit correction. However, in other embodiments the ECC generator 304 may use a less robust algorithm and may correct single-bit or double-bit errors. In another embodiment, the non-volatile storage device 110 may comprise less reliable storage such as multi-level cell ("MLC") flash in order to increase capacity, which storage may not be sufficiently reliable without more robust ECC algorithms.

In one embodiment, the write pipeline 106 includes an input buffer 306 that receives a data segment to be written to the non-volatile storage media 110 and stores the incoming data segments until the next stage of the write data pipeline 106, such as the packetizer 302 (or other stage for a more complex write data pipeline 106) is ready to process the next data segment. The input buffer 306 typically allows for discrepancies between the rate data segments are received and processed by the write data pipeline 106 using an appropriately sized data buffer. The input buffer 306 also allows the data bus 204 to transfer data to the write data pipeline 106 at rates greater than can be sustained by the write data pipeline 106 in order to improve efficiency of operation of the data bus 204. Typically, when the write data pipeline 106 does not include an input buffer 306, a buffering function is performed elsewhere, such as in the non-volatile storage device 102 but outside the write data pipeline 106, in the host computing system 114, such as within a network interface card ("NIC"), or at another device, for example when using remote direct memory access ("RDMA").

In another embodiment, the write data pipeline 106 also includes a write synchronization buffer 308 that buffers packets received from the ECC generator 304 prior to writing the packets to the non-volatile storage media 110. The write synchronization buffer 308 is located at a boundary between a local clock domain and a non-volatile storage clock domain and provides buffering to account for the clock domain differences. In other embodiments, synchronous non-volatile storage media 110 may be used and synchronization buffers 308 328 may be eliminated.

In one embodiment, the write data pipeline 106 also includes a media encryption module 318 that receives the one or more packets from the packetizer 302, either directly or indirectly, and encrypts the one or more packets using an encryption key unique to the non-volatile storage device 102 prior to sending the packets to the ECC generator 304. Typically, the entire packet is encrypted, including the headers. In another embodiment, headers are not encrypted. In this document, encryption key is understood to mean a secret encryption key that is managed externally from a storage controller 104.

The media encryption module 318 and corresponding media decryption module 332 provide a level of security for data stored in the non-volatile storage media 110. For example, where data is encrypted with the media encryption module 318, if the non-volatile storage media 110 is connected to a different storage controller 104, non-volatile storage device 102, or server, the contents of the non-volatile storage media 110 typically could not be read without use of the same encryption key used during the write of the data to the non-volatile storage media 110 without significant effort.

In a typical embodiment, the non-volatile storage device 102 does not store the encryption key in non-volatile storage and allows no external access to the encryption key. The encryption key is provided to the storage controller 104 during initialization. The non-volatile storage device 102 may use and store a non-secret cryptographic nonce that is used in conjunction with an encryption key. A different nonce may be stored with every packet. Data segments may be split between multiple packets with unique nonces for the purpose of improving protection by the encryption algorithm.

The encryption key may be received from a host computing system 114, a server, key manager, or other device that manages the encryption key to be used by the storage controller 104. In another embodiment, the non-volatile storage media 110 may have two or more partitions and the storage controller 104 behaves as though it was two or more storage controllers 104, each operating on a single partition within the non-volatile storage media 110. In this embodiment, a unique media encryption key may be used with each partition.

In another embodiment, the write data pipeline 106 also includes an encryption module 314 that encrypts a data or metadata segment received from the input buffer 306, either directly or indirectly, prior sending the data segment to the packetizer 302, the data segment encrypted using an encryption key received in conjunction with the data segment. The encryption keys used by the encryption module 314 to encrypt data may not be common to all data stored within the non-volatile storage device 102 but may vary on an per data structure basis and received in conjunction with receiving data segments as described below. For example, an encryption key for a data segment to be encrypted by the encryption module 314 may be received with the data segment or may be received as part of a command to write a data structure to which the data segment belongs. The solid-sate storage device 102 may use and store a non-secret cryptographic nonce in each data structure packet that is used in conjunction with the encryption key. A different nonce may be stored with every packet. Data segments may be split between multiple packets with unique nonces for the purpose of improving protection by the encryption algorithm.

The encryption key may be received from a host computing system 114, another computer, key manager, or other device that holds the encryption key to be used to encrypt the data segment. In one embodiment, encryption keys are transferred to the storage controller 104 from one of a non-volatile storage device 102, host computing system 114, computer, or other external agent, which has the ability to execute industry standard methods to securely transfer and protect private and public keys.

In one embodiment, the encryption module 314 encrypts a first packet with a first encryption key received in conjunction with the packet and encrypts a second packet with a second encryption key received in conjunction with the second packet. In another embodiment, the encryption module 314 encrypts a first packet with a first encryption key received in conjunction with the packet and passes a second data packet on to the next stage without encryption. Beneficially, the encryption module 314 included in the write data pipeline 106 of the non-volatile storage device 102 allows data structure-by-data structure or segment-by-segment data encryption without a single file system or other external system to keep track of the different encryption keys used to store corresponding data structures or data segments. Each requesting device 155 or related key manager independently manages encryption keys used to encrypt only the data structures or data segments sent by the requesting device 155.

In one embodiment, the encryption module 314 may encrypt the one or more packets using an encryption key unique to the non-volatile storage device 102. The encryption module 314 may perform this media encryption independently, or in addition to the encryption described above. Typically, the entire packet is encrypted, including the headers. In another embodiment, headers are not encrypted. The media encryption by the encryption module 314 provides a level of security for data stored in the non-volatile storage media 110. For example, where data is encrypted with media encryption unique to the specific non-volatile storage device 102, if the non-volatile storage media 110 is connected to a different storage controller 104, non-volatile storage device 102, or host computing system 114, the contents of the non-volatile storage media 110 typically could not be read without use of the same encryption key used during the write of the data to the non-volatile storage media 110 without significant effort.

In another embodiment, the write data pipeline 106 includes a compression module 312 that compresses the data for metadata segment prior to sending the data segment to the packetizer 302. The compression module 312 typically compresses a data or metadata segment using a compression routine known to those of skill in the art to reduce the storage size of the segment. For example, if a data segment includes a string of 512 zeros, the compression module 312 may replace the 512 zeros with code or token indicating the 512 zeros where the code is much more compact than the space taken by the 512 zeros.

In one embodiment, the compression module 312 compresses a first segment with a first compression routine and passes along a second segment without compression. In another embodiment, the compression module 312 compresses a first segment with a first compression routine and compresses the second segment with a second compression routine. Having this flexibility within the non-volatile storage device 102 is beneficial so that computing systems 114 or other devices writing data to the non-volatile storage device 102 may each specify a compression routine or so that one can specify a compression routine while another specifies no compression. Selection of compression routines may also be selected according to default settings on a per data structure type or data structure class basis. For example, a first data structure of a specific data structure may be able to override default compression routine settings and a second data structure of the same data structure class and data structure type may use the default compression routine and a third data structure of the same data structure class and data structure type may use no compression.

In one embodiment, the write data pipeline 106 includes a garbage collector bypass 316 that receives data segments from the read data pipeline 108 as part of a data bypass in a garbage collection system. A garbage collection system (also referred to as a "groomer" or grooming operation) typically marks packets that are no longer valid, typically because the packet is marked for deletion or has been modified and the modified data is stored in a different location. At some point, the garbage collection system determines that a particular section (e.g., an erase block) of storage may be recovered. This determination may be due to a lack of available storage capacity, the percentage of data marked as invalid reaching a threshold, a consolidation of valid data, an error detection rate for that section of storage reaching a threshold, or improving performance based on data distribution, etc. Numerous factors may be considered by a garbage collection algorithm to determine when a section of storage is to be recovered.

Once a section of storage has been marked for recovery, valid packets in the section typically must be relocated. The garbage collector bypass 316 allows packets to be read into the read data pipeline 108 and then transferred directly to the write data pipeline 106 without being routed out of the storage controller 104. In one embodiment, the garbage collector bypass 316 is part of an autonomous garbage collector system that operates within the non-volatile storage device 102. This allows the non-volatile storage device 102 to manage data so that data is systematically spread throughout the non-volatile storage media 110 to improve performance, data reliability and to avoid overuse and underuse of any one location or area of the non-volatile storage media 110 and to lengthen the useful life of the non-volatile storage media 110.

The garbage collector bypass 316 coordinates insertion of segments into the write data pipeline 106 with other segments being written by computing systems 114 or other devices. In the depicted embodiment, the garbage collector bypass 316 is before the packetizer 302 in the write data pipeline 106 and after the depacketizer 324 in the read data pipeline 108, but may also be located elsewhere in the read and write data pipelines 106, 108. The garbage collector bypass 316 may be used during a flush of the write pipeline 108 to fill the remainder of the logical page in order to improve the efficiency of storage within the non-volatile storage media 110 and thereby reduce the frequency of garbage collection.

Grooming may comprise refreshing data stored on the non-volatile storage media 110. Data stored on the non-volatile storage media 110 may degrade over time. The storage controller 104 may comprise a groomer that identifies "stale" data on the non-volatile storage device 102 (data that has not been modified and/or moved for a pre-determined time), and refreshes the stale data by re-writing the data to a different storage location.

In some embodiments, the garbage collection system, groomer, and/or garbage collection bypass 316 may be temporarily disabled to allow data to be stored contiguously on physical storage locations of the non-volatile storage device 102. Disabling the garbage collection system and/or bypass 316 may ensure that data in the write data pipeline 106 is not interleaved with other data.

In some embodiments, the garbage collection and/or groomer may be restricted to a certain portion of the physical storage space of the non-volatile storage device. For example, storage metadata, such as the reverse index described below, may be periodically persisted to a non-volatile storage location. The garbage collection and/or grooming may be restricted to operating on portions of the non-volatile storage media that correspond to the persisted storage metadata.

In one embodiment, the write data pipeline 106 includes a write buffer 320 that buffers data for efficient write operations. Typically, the write buffer 320 includes enough capacity for packets to fill at least one logical page in the non-volatile storage media 110. This allows a write operation to send an entire logical page of data to the non-volatile storage media 110 without interruption. By sizing the write buffer 320 of the write data pipeline 106 and buffers within the read data pipeline 108 to be the same capacity or larger than a storage write buffer within the non-volatile storage media 110, writing and reading data is more efficient since a single write command may be crafted to send a full logical page of data to the non-volatile storage media 110 instead of multiple commands.

While the write buffer 320 is being filled, the non-volatile storage media 110 may be used for other read operations. This is advantageous because other non-volatile devices with a smaller write buffer or no write buffer may tie up the non-volatile storage when data is written to a storage write buffer and data flowing into the storage write buffer stalls. Read operations will be blocked until the entire storage write buffer is filled and programmed. Another approach for systems without a write buffer or a small write buffer is to flush the storage write buffer that is not full in order to enable reads. Again, this is inefficient because multiple write/program cycles are required to fill a page.

For depicted embodiment with a write buffer 320 sized larger than a logical page, a single write command, which includes numerous subcommands, can then be followed by a single program command to transfer the page of data from the storage write buffer in each non-volatile storage element 216, 218, 220 to the designated page within each non-volatile storage element 216, 218, 220. This technique has the benefits of eliminating partial page programming, which is known to reduce data reliability and durability and freeing up the destination bank for reads and other commands while the buffer fills.

In one embodiment, the write buffer 320 is a ping-pong buffer where one side of the buffer is filled and then designated for transfer at an appropriate time while the other side of the ping-pong buffer is being filled. In another embodiment, the write buffer 320 includes a first-in first-out ("FIFO") register with a capacity of more than a logical page of data segments. One of skill in the art will recognize other write buffer 320 configurations that allow a logical page of data to be stored prior to writing the data to the non-volatile storage media 110.

In another embodiment, the write buffer 320 is sized smaller than a logical page so that less than a page of information could be written to a storage write buffer in the non-volatile storage media 110. In the embodiment, to prevent a stall in the write data pipeline 106 from holding up read operations, data is queued using the garbage collection system that needs to be moved from one location to another as part of the garbage collection process. In case of a data stall in the write data pipeline 106, the data can be fed through the garbage collector bypass 316 to the write buffer 320 and then on to the storage write buffer in the non-volatile storage media 110 to fill the pages of a logical page prior to programming the data. In this way, a data stall in the write data pipeline 106 would not stall reading from the non-volatile storage device 102.

In another embodiment, the write data pipeline 106 includes a write program module 310 with one or more user-definable functions within the write data pipeline 106. The write program module 310 allows a user to customize the write data pipeline 106. A user may customize the write data pipeline 106 based on a particular data requirement or application. Where the storage controller 104 is an FPGA, the user may program the write data pipeline 106 with custom commands and functions relatively easily. A user may also use the write program module 310 to include custom functions with an ASIC, however, customizing an ASIC may be more difficult than with an FPGA. The write program module 310 may include buffers and bypass mechanisms to allow a first data segment to execute in the write program module 310 while a second data segment may continue through the write data pipeline 106. In another embodiment, the write program module 310 may include a processor core that can be programmed through software.

Note that the write program module 310 is shown between the input buffer 306 and the compression module 312, however, the write program module 310 could be anywhere in the write data pipeline 106 and may be distributed among the various stages 302-320. In addition, there may be multiple write program modules 310 distributed among the various states 302-320 that are programmed and operate independently. In addition, the order of the stages 302-320 may be altered. One of skill in the art will recognize workable alterations to the order of the stages 302-320 based on particular user requirements.

The read data pipeline 108 includes an ECC correction module 322 that determines if a data error exists in ECC blocks a requested packet received from the non-volatile storage media 110 by using ECC stored with each ECC block of the requested packet. The ECC correction module 322 then corrects any errors in the requested packet if any error exists and the errors are correctable using the ECC. For example, if the ECC can detect an error in six bits but can only correct three bit errors, the ECC correction module 322 corrects ECC blocks of the requested packet with up to three bits in error. The ECC correction module 322 corrects the bits in error by changing the bits in error to the correct one or zero state so that the requested data packet is identical to when it was written to the non-volatile storage media 110 and the ECC was generated for the packet.

If the ECC correction module 322 determines that the requested packets contains more bits in error than the ECC can correct, the ECC correction module 322 cannot correct the errors in the corrupted ECC blocks of the requested packet and sends an interrupt. In one embodiment, the ECC correction module 322 sends an interrupt with a message indicating that the requested packet is in error. The message may include information that the ECC correction module 322 cannot correct the errors or the inability of the ECC correction module 322 to correct the errors may be implied. In another embodiment, the ECC correction module 322 sends the corrupted ECC blocks of the requested packet with the interrupt and/or the message.

In one embodiment, a corrupted ECC block or portion of a corrupted ECC block of the requested packet that cannot be corrected by the ECC correction module 322 is read by the master controller 224, corrected, and returned to the ECC correction module 322 for further processing by the read data pipeline 108. In one embodiment, a corrupted ECC block or portion of a corrupted ECC block of the requested packet is sent to the device requesting the data. The requesting device 155 may correct the ECC block or replace the data using another copy, such as a backup or mirror copy, and then may use the replacement data of the requested data packet or return it to the read data pipeline 108. The requesting device 155 may use header information in the requested packet in error to identify data required to replace the corrupted requested packet or to replace the data structure to which the packet belongs. In another embodiment, the storage controller 104 stores data using some type of RAID and is able to recover the corrupted data. In another embodiment, the ECC correction module 322 sends an interrupt and/or message and the receiving device fails the read operation associated with the requested data packet. One of skill in the art will recognize other options and actions to be taken as a result of the ECC correction module 322 determining that one or more ECC blocks of the requested packet are corrupted and that the ECC correction module 322 cannot correct the errors.

The read data pipeline 108 includes a depacketizer 324 that receives ECC blocks of the requested packet from the ECC correction module 322, directly or indirectly, and checks and removes one or more packet headers. The depacketizer 324 may validate the packet headers by checking packet identifiers, data length, data location, etc. within the headers. In one embodiment, the header includes a hash code that can be used to validate that the packet delivered to the read data pipeline 108 is the requested packet. The depacketizer 324 also removes the headers from the requested packet added by the packetizer 302. The depacketizer 324 may directed to not operate on certain packets but pass these forward without modification. An example might be a container label that is requested during the course of a rebuild process where the header information is required for index reconstruction. Further examples include the transfer of packets of various types destined for use within the non-volatile storage device 102. In another embodiment, the depacketizer 324 operation may be packet type dependent.

The read data pipeline 108 includes an alignment module 326 that receives data from the depacketizer 324 and removes unwanted data. In one embodiment, a read command sent to the non-volatile storage media 110 retrieves a packet of data. A device requesting the data may not require all data within the retrieved packet and the alignment module 326 removes the unwanted data. If all data within a retrieved page is requested data, the alignment module 326 does not remove any data.

The alignment module 326 re-formats the data as data segments of a data structure in a form compatible with a device requesting the data segment prior to forwarding the data segment to the next stage. Typically, as data is processed by the read data pipeline 108, the size of data segments or packets changes at various stages. The alignment module 326 uses received data to format the data into data segments suitable to be sent to the requesting device 155 and joined to form a response. For example, data from a portion of a first data packet may be combined with data from a portion of a second data packet. If a data segment is larger than a data requested by the requesting device 155, the alignment module 326 may discard the unwanted data.

In one embodiment, the read data pipeline 108 includes a read synchronization buffer 328 that buffers one or more requested packets read from the non-volatile storage media 110 prior to processing by the read data pipeline 108. The read synchronization buffer 328 is at the boundary between the non-volatile storage clock domain and the local bus clock domain and provides buffering to account for the clock domain differences.

In another embodiment, the read data pipeline 108 includes an output buffer 330 that receives requested packets from the alignment module 326 and stores the packets prior to transmission to the requesting device 155. The output buffer 330 accounts for differences between when data segments are received from stages of the read data pipeline 108 and when the data segments are transmitted to other parts of the storage controller 104 or to the requesting device 155. The output buffer 330 also allows the data bus 204 to receive data from the read data pipeline 108 at rates greater than can be sustained by the read data pipeline 108 in order to improve efficiency of operation of the data bus 204.

In one embodiment, the read data pipeline 108 includes a media decryption module 332 that receives one or more encrypted requested packets from the ECC correction module 322 and decrypts the one or more requested packets using the encryption key unique to the non-volatile storage device 102 prior to sending the one or more requested packets to the depacketizer 324. Typically, the encryption key used to decrypt data by the media decryption module 332 is identical to the encryption key used by the media encryption module 318. In another embodiment, the non-volatile storage media 110 may have two or more partitions and the storage controller 104 behaves as though it was two or more storage controllers 104 each operating on a single partition within the non-volatile storage media 110. In this embodiment, a unique media encryption key may be used with each partition.

In another embodiment, the read data pipeline 108 includes a decryption module 334 that decrypts a data segment formatted by the depacketizer 324 prior to sending the data segment to the output buffer 330. The data segment may be decrypted using an encryption key received in conjunction with the read request that initiates retrieval of the requested packet received by the read synchronization buffer 328. The decryption module 334 may decrypt a first packet with an encryption key received in conjunction with the read request for the first packet and then may decrypt a second packet with a different encryption key or may pass the second packet on to the next stage of the read data pipeline 108 without decryption. When the packet was stored with a non-secret cryptographic nonce, the nonce is used in conjunction with an encryption key to decrypt the data packet. The encryption key may be received from a host computing system 114, a client, key manager, or other device that manages the encryption key to be used by the storage controller 104.

In another embodiment, the read data pipeline 108 includes a decompression module 336 that decompresses a data segment formatted by the depacketizer 324. In one embodiment, the decompression module 336 uses compression information stored in one or both of the packet header and the container label to select a complementary routine to that used to compress the data by the compression module 312. In another embodiment, the decompression routine used by the decompression module 336 is dictated by the device requesting the data segment being decompressed. In another embodiment, the decompression module 336 selects a decompression routine according to default settings on a per data structure type or data structure class basis. A first packet of a first object may be able to override a default decompression routine and a second packet of a second data structure of the same data structure class and data structure type may use the default decompression routine and a third packet of a third data structure of the same data structure class and data structure type may use no decompression.

In another embodiment, the read data pipeline 108 includes a read program module 338 that includes one or more user-definable functions within the read data pipeline 108. The read program module 338 has similar characteristics to the write program module 310 and allows a user to provide custom functions to the read data pipeline 108. The read program module 338 may be located as shown in FIG. 3, may be located in another position within the read data pipeline 108, or may include multiple parts in multiple locations within the read data pipeline 108. Additionally, there may be multiple read program modules 338 within multiple locations within the read data pipeline 108 that operate independently. One of skill in the art will recognize other forms of a read program module 338 within a read data pipeline 108. As with the write data pipeline 106, the stages of the read data pipeline 108 may be rearranged and one of skill in the art will recognize other orders of stages within the read data pipeline 108.

The storage controller 104 includes control and status registers 340 and corresponding control queues 342. The control and status registers 340 and control queues 342 facilitate control and sequencing commands and subcommands associated with data processed in the write and read data pipelines 106, 108. For example, a data segment in the packetizer 302 may have one or more corresponding control commands or instructions in a control queue 342 associated with the ECC generator 304. As the data segment is packetized, some of the instructions or commands may be executed within the packetizer 302. Other commands or instructions may be passed to the next control queue 342 through the control and status registers 340 as the newly formed data packet created from the data segment is passed to the next stage.

Commands or instructions may be simultaneously loaded into the control queues 342 for a packet being forwarded to the write data pipeline 106 with each pipeline stage pulling the appropriate command or instruction as the respective packet is executed by that stage. Similarly, commands or instructions may be simultaneously loaded into the control queues 342 for a packet being requested from the read data pipeline 108 with each pipeline stage pulling the appropriate command or instruction as the respective packet is executed by that stage. One of skill in the art will recognize other features and functions of control and status registers 340 and control queues 342.

The storage controller 104 and or non-volatile storage device 102 may also include a bank interleave controller 344, a synchronization buffer 346, a storage bus controller 348, and a multiplexer ("MUX") 350.

Figure 4:
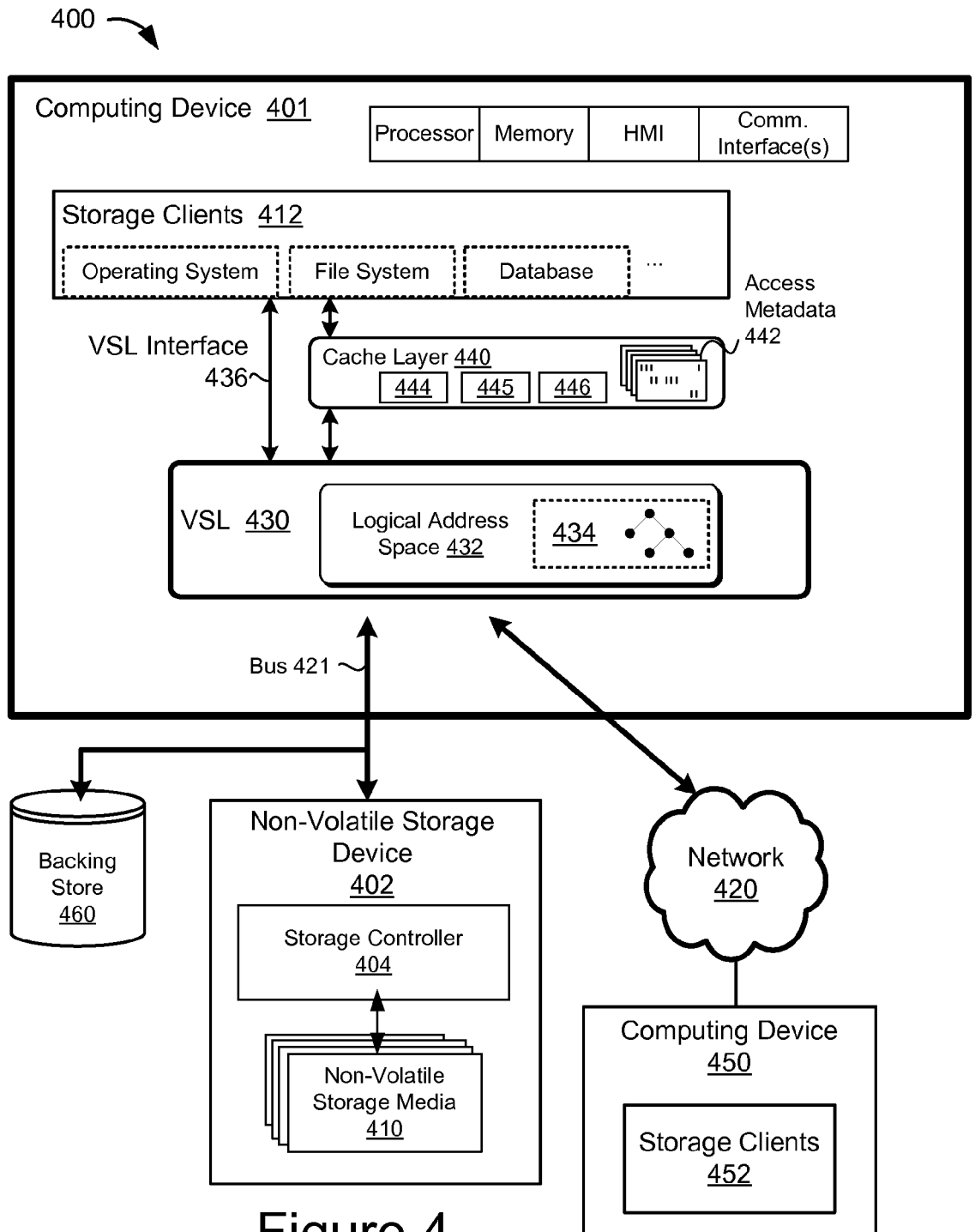
FIG. 4 is a block diagram of one embodiment of a system comprising a storage layer.

In some embodiments, a storage layer provides an interface through which storage clients perform persistent operations. The storage layer may simplify data storage operations for storage clients and expose enhanced storage features, such as atomicity, transactional support, recovery, and so on. FIG. 4 depicts one embodiment of a system 400 comprising a storage layer (SL) 430 that presents a logical address space 432 of the non-volatile storage device 402 to storage client applications 412 operating on a computing device 401. The computing device 401 may comprise a processor, non-volatile storage, memory, human-machine interface (HMI) components, communication interfaces (for communication via the network 420), and the like.

The non-volatile storage device 402 may comprise a single non-volatile storage device, may comprise a plurality of non-volatile storage devices, a cluster of storage devices, or other suitable configuration. The storage layer 430 may comprise a driver, a user-space application, or the like. In some embodiments, the storage layer 430 is implemented in conjunction with the driver 118 described above. The storage layer 430 and/or the storage clients 412 may be embodied as instructions stored on a non-volatile storage device.

The SL 430 may maintain and present a logical address space to 432 to the storage clients 412 via one or more interfaces and/or APIs provided by the SL 430 (SL interface 436). The storage clients 412 may include, but are not limited to: operating systems, virtual operating systems (e.g., guest operating systems, hypervisors, etc.), file systems, database applications, server applications, general-purpose applications, and the like. In some embodiments, one or more storage clients 452 operating on a remote computing device 450 access the SL 430 via a network 420.

The SL 430 is configured to perform persistent storage operations on the non-volatile storage device 402, which may comprise a non-volatile storage device as described above. The SL 430 communicates with the non-volatile storage device 402 via a communication bus 421, which may include, but is not limited to: a PCE-e bus, a network connection (e.g., Infiniband), a storage network, Fibre Channel Protocol (FCP) network, HyperSCSI, or the like. The storage operations may be configured according to the capabilities and/or configuration of the non-volatile storage device 402. For example, if the non-volatile storage device 402 comprises a write-once, block-erasable device, the SL 430 may be configured to perform storage operations accordingly (e.g., storage data on initialized or erased storage locations, etc.).

In some embodiments, the SL 430 accesses storage metadata 434 to maintain associations between logical identifiers (e.g., blocks) in the logical address space 432 and physical storage locations on the non-volatile storage device 402. As used herein, a physical storage location may refer to any storage location of the non-volatile storage device 402, which may include, but are not limited to: storage divisions, erase blocks, storage units, pages, logical pages, logical erase blocks, and so on.

The SL 430 maintains "any-to-any" assignments between logical identifiers in the logical address space 432 and physical storage locations on the non-volatile storage device 402. The SL 430 may cause data to be written or updated "out-of-place" on the non-volatile storage device 402. In some embodiments, data is stored sequentially and in a log-based format. Storing data "out-of-place" provides wear-leveling benefits and addresses "erase-and-program-once" properties of many non-volatile storage devices. Moreover, out-of-place writing (and writing data in logical storage locations as opposed to individual pages) addresses asymmetric properties of the non-volatile storage device 402. Asymmetric properties refers to the idea that different storage operations (read, write, erase) take very different amounts of time. For example, it may take ten times as long to program data on a non-volatile storage media 410 as it takes to read data from the solid-state storage element media 410. Moreover, in some cases, data may only be programmed to physical storage locations that have first been initialized (e.g., erased). An erase operation may take ten times as long as a program operation (and by extension one hundred times as long as a read operation). Associations between logical identifiers in the logical address space 432 and physical storage locations on the non-volatile storage device 402 are maintained in the storage metadata 434.

In some embodiments, the SL 430 causes data to be persisted on the non-volatile storage 402 in a sequential, log-based format. Sequential, log-based storage may comprise persisting the order of storage operations performed on the non-volatile storage device 402. In some embodiments, data is stored with persistent metadata that is persisted on the non-volatile storage device 402 with the data itself. For example, a sequence order of storage operations performed may be maintained using sequence indicators (e.g., timestamps, sequence numbers, or other indicators) that are stored on the non-volatile storage device 402 and/or the current storage location (e.g., append point, discussed below) of the non-volatile storage device 402.

Persisting data in a sequential, log-based format may comprise persisting metadata on the non-volatile storage device 402 that describes the data. The persistent metadata may be stored with the data itself (e.g., in the same program and/or storage operation and/or in the smallest write unit supported by the non-volatile storage device 402); the persistent metadata may, therefore, be guaranteed to be stored with the data it describes. In some embodiments, data is stored in a container format (e.g., a packet, ECC codeword, etc.). Persistent metadata may be included as part of the packet format of the data (e.g., as a header, footer, or other field within the packet). Alternatively, or in addition, portions of the persistent metadata may be stored separately from the data it describes. In this case, the persistent metadata may be linked to (or otherwise reference) the data it describes (or vice versa).

The persistent metadata describes the data and may include, but is not limited to: a logical identifier (or other identifier) of the data, security or access control parameters, sequence information (e.g., a sequence indicator), a persistent metadata flag (e.g., indicating inclusion in an atomic storage operation), a transaction identifier, or the like. The persistent metadata may comprise sufficient information to reconstruct portions of the storage metadata 434 and/or replay the sequence of storage operations performed on the non-volatile storage device 402.

Data stored in the sequential, log-based format described herein may comprise an "event log" of storage operations that are performed on the non-volatile storage device 402. Accordingly, the SL 430 may be capable of replaying a sequence of storage operations performed on the non-volatile storage device 402 by accessing the data stored on the non-volatile storage media 410 in a particular order that matches the order of the event log. The sequential, log-based data format enables the SL 430 to reconstruct the storage metadata 434, as well as other data, in the event of an invalid shutdown (or other failure condition). Examples of apparatus, systems, and methods for crash recovery and/or data integrity despite invalid shutdown conditions are described in U.S. Provisional Patent Application No. 61/424,585, entitled, "APPARATUS, SYSTEM, AND METHOD FOR PERSISTENT MANAGEMENT OF DATA IN A CACHE DEVICE," filed Dec. 17, 2010, and in U.S. Provisional Patent Application No. 61/425,167, entitled, "APPARATUS, SYSTEM, AND METHOD FOR PERSISTENT MANAGEMENT OF DATA IN A CACHE DEVICE," filed Dec. 20, 2010, which are hereby incorporated by reference in their entirety. In some embodiments, the non-volatile storage device 402 comprises a secondary power source 407 (e.g., battery, capacitor, etc.) to power the storage controller 404 and/or non-volatile storage media 410 in the event of an invalid shutdown. The non-volatile storage device 402 (or controller 404) may, therefore, comprise a "protection domain" or "powercut safe domain" (defined by the secondary power source 407). Once data is transferred to within the protection domain, of the non-volatile storage device, it may be guaranteed to be persisted on the non-volatile storage media 410. Alternatively, or in addition, the storage controller 404 may be capable of performing storage operations independent of the host computing device 401.

The sequential, log-based storage format implemented by the SL 430 provides crash-recovery and/or data integrity for the data stored on the non-volatile storage 402 as well as the storage metadata 434. After an invalid shutdown and reconstruction operation, the SL 430 may expose the reconstructed storage metadata 434 to storage clients 412. The storage clients 412 may, therefore, delegate crash-recovery and/or data integrity to the SL 430, which may significantly simplify the storage clients 412 and/or allow the storage clients 412 to operate more efficiently. For example, a file system storage client 412 may require crash-recovery and/or data integrity services for some of its metadata, such as I-node tables, file allocation tables, and so on. The storage client 412 may have to implement these services itself, which may impose significant overhead and/or complexity on the storage client 412. The storage client 412 may be relieved from this overhead by delegating crash recovery and/or data integrity to the SL 430. As described above, the SL 430 stores data in a sequential, log-based format. As such, in the event of an invalid shutdown, the SL 430 is capable of reconstructing the storage metadata 434 and/or identifying the "current" version of data using the sequential, log-based formatted data on the non-volatile storage device 402. The SL 430 provides access to the reconstructed storage metadata 434 and/or data via the SL interface 436. Accordingly, after an invalid shutdown, a file system storage client 412 may access crash-recovered file system metadata and/or may ensure the integrity of file data accessed through the SL 430.

The logical address space 432 may be "sparse" meaning the logical address space 432 is large enough that allocated/assigned logical identifiers are non-contiguous and separated by sections of one or more unallocated/unassigned addresses, and, as such, may comprise a logical capacity that exceeds the physical storage capacity of the non-volatile storage device 402. Accordingly, the logical address space 432 may be defined independent of the non-volatile storage device 402; the logical address space 432 may present a larger address space than the physical storage capacity of the non-volatile storage device 402, may present different storage location partitions and/or block sizes than provided by the non-volatile storage device 402, and so on. Associations between the logical address space 432 and the non-volatile storage 402 are managed by the SL 430 (using the storage metadata 434). Storage clients 412 may leverage the SL interface 436, as opposed to a more limited block-storage layer and/or the other storage interface provided by a particular non-volatile storage device 402.

In some embodiments, the logical address space 432 may be very large, comprising a 64-bit address space referenced by 64-bit logical identifiers (LIDs). Each 64-bit logical identifier in the logical address space 432 (e.g., 64-bit address) references a respective virtual storage location. As used herein, a virtual storage location refers to a block of logical storage capacity (e.g., an allocation block). The VSL 430 may be configured to implement arbitrarily sized virtual storage locations; typical sizes range from 512 to 4086 bytes (or even 8 kb to 16 kb depending on the needs of the storage clients 412); the disclosure, however, is not limited in this regard. Since the logical address space 432 (and the virtual storage locations therein) is independent of the physical storage capacity and/or storage partitioning of the non-volatile storage device 402, the logical address space 432 may be tailored to the requirements of the storage clients 412.

The SL 430 may manage allocations within the logical address space using storage metadata 434. In some embodiments, the SL 430 maintains storage metadata 434 that tracks allocations of the logical address space 432 using a forward index. The SL 430 may allocate ranges within the logical address space 432 for use by particular storage clients 412. Logical identifiers may be allocated for a particular storage client 412 to persist a storage entity. As used herein, a storage entity refers to any data or data structure in the logical address space 412 that is capable of being persisted to the non-volatile storage device 402; accordingly, a storage entity may include, but is not limited to: file system objects (e.g., files, streams, I-nodes, etc.), a database primitive (e.g., database table, extent, or the like), streams, persistent memory space, memory mapped files, or the like. A storage entity may also be referred to as a Virtual Storage Unit (VSU). A file system object refers to any data structure used by a file system including, but not limited to: a file, a stream, file attributes, file index, volume index, node table, or the like.

As described above, allocating a logical identifier refers to reserving a logical identifier for a particular use or storage client. A logical identifier may refer to a set or range of the logical address space 432 (e.g., a set or range of virtual storage locations). The logical capacity of an allocated logical identifier may be determined by the size of the virtual storage locations of the logical address space 432. As described above, the logical address space 432 may be configured to present virtual storage locations of any pre-determined size. The size of the virtual storage locations may be configured by one or more storage clients 412, the VSL 430, or the like.

An allocated logical identifier, however, may not necessarily be associated with and/or assigned to physical storage locations on the non-volatile storage device 402 until required. In some embodiments, the SL 430 allocates logical identifiers comprising large, contiguous ranges in the logical address space 432. The availability of large, contiguous ranges in the logical address space is enabled by the large address space (e.g., 64-bit address space) presented by the SL 430. For example, a logical identifier allocated for a file may be associated by the SL 430 with an address range of 2 32 contiguous virtual storage locations in the logical address space 432 for data of the file. If the virtual storage locations (e.g., allocation blocks) are 512 bytes each, the allocated logical identifier may represent a logical capacity of two (2) terabytes. The physical storage capacity of the non-volatile storage device 402 may be smaller than two (2) terabytes and/or may be sufficient to store only a small number of such files, such that if logical identifier allocations were to cause equivalent assignments in physical storage space, the SL 430 would quickly exhaust the capacity of the non-volatile storage device 402. Advantageously, however, the SL 430 is configured to allocate large, contiguous ranges within the logical address space 432 and to defer assigning physical storage locations on the non-volatile storage device 402 to the logical identifiers until necessary. Similarly, the SL 430 may support the use of "sparse" allocated logical ranges. For example, a storage client 412 may request that a first data segment be persisted at the "head" of an allocated logical identifier and a second data segment be persisted at the "tail" of an allocated logical identifier. The SL 430 may assign only those physical storage locations on the non-volatile storage device 402 that are needed to persist the first and second data segments. The SL 430 may not assign or reserve physical storage locations on the non-volatile storage device 402 for allocated logical identifiers that are not being used to persist data.

The SL 430 maintains storage metadata 434 to track allocations in the logical address space and to track assignments between logical identifiers in the logical address space 432 and physical storage locations on the non-volatile storage media 410. In some embodiments, the SL 430 track both logical allocations and physical storage location assignments using a single metadata structure. Alternatively, or in addition, the SL 430 may be configured to track logical allocations in logical allocation metadata and to track assigned physical storage locations on the non-volatile storage media 410 using separate, physical reservation metadata.

Storage clients 412 may access the SL 430 via the SL interface 436. In some embodiments, storage clients 412 may delegate certain functions to the SL. For example, and as described above, storage clients 412 may leverage the sequential, log-based data format of the SL 430 to delegate crash recovery and/or data integrity functions to the SL 430. In some embodiments, storage clients may also delegate allocations in the logical address space 432 and/or physical storage reservations to the SL 430.

Typically, a storage client 412, such as a file system, tracks the logical addresses and/or physical storage locations that are available for use. The logical storage locations available to the storage client 412 may be limited to the physical storage capacity of the underlying non-volatile storage device (or partition thereof). Accordingly, the storage client 412 may maintain a set of logical addresses that "mirrors" the physical storage locations of the non-volatile storage device. For example, and as shown in FIG. 4, a storage client 412 may identify one or more available logical block addresses (LBAs) for a new file. Since the LBAs map directly to physical storage locations in conventional implementations, the LBAs are unlikely to be contiguous; the availability of contiguous LBAs may depend upon the capacity of the underlying block storage device and/or whether the device is "fragmented." The storage client 412 then performs block-level operations to store the file through, inter alia, a block storage layer (e.g., a block-device interface). If the underlying storage device provides a one-to-one mapping between logical block address and physical storage locations, as with conventional storage devices, the block storage layer performs appropriate LBA-to-physical address translations and implements the requested storage operations. If, however, the underlying non-volatile storage device does not support one-to-one mappings (e.g., the underlying storage device is a sequential, or write-out-of-place device, such as a non-volatile storage device, in accordance with embodiments of this disclosure), another redundant set of translations is needed (e.g., a Flash Translation Layer, or other mapping). The redundant set of translations and the requirement that the storage client 412 maintain logical address allocations may represent a significant overhead for storage operations performed by the storage client 412 and may make allocating contiguous LBA ranges difficult or impossible without time-consuming "defragmentation" operations.

In some embodiments, storage clients 412 delegate allocation functionality to the SL 430. Storage clients 412 may access the SL interface 436 to request logical ranges in the logical address space 432. The SL 430 tracks the allocation status of the logical address space 432 using the storage metadata 434. If the SL 430 determines that the requested logical address range is unallocated, the SL 430 allocates the requested logical address range for the storage client 412. If the requested range is allocated (or only a portion of the range is unallocated), the SL 430 may return an alternative range in the logical address space 430 and/or may return a failure. In some embodiments, the SL 430 may return an alternative range in the logical address space 430 that includes contiguous range of logical addresses. Having a contiguous range of logical addresses often simplifies the management of the storage entity associated with this range of logical addresses. Since the SL 430 uses the storage metadata 434 to maintain associations between the logical address space 432 and physical storage locations on the non-volatile storage device 402, no redundant set of address translations is needed. Moreover, the SL 430 uses the storage metadata 434 to identify unallocated logical identifiers, which frees the storage client 412 from this overhead.

In some embodiments, the SL 430 makes allocations within the logical address space 432 as described above. The SL 430 may access an index comprising allocated logical address ranges (e.g., forward index of FIG. 5) to identify unallocated logical identifiers, which are allocated to storage clients 412 upon request. For example, the SL 430 may maintain storage metadata 434 comprising a range-encoded tree data structure, as described above; entries in the tree may represent allocated logical identifiers in the logical address space 432, and "holes" in the tree represent unallocated logical identifiers. Alternatively, or in addition, the SL 430 maintains an index of unallocated logical identifiers that can be allocated to storage clients (e.g., without searching a forward index).

Figure 5:
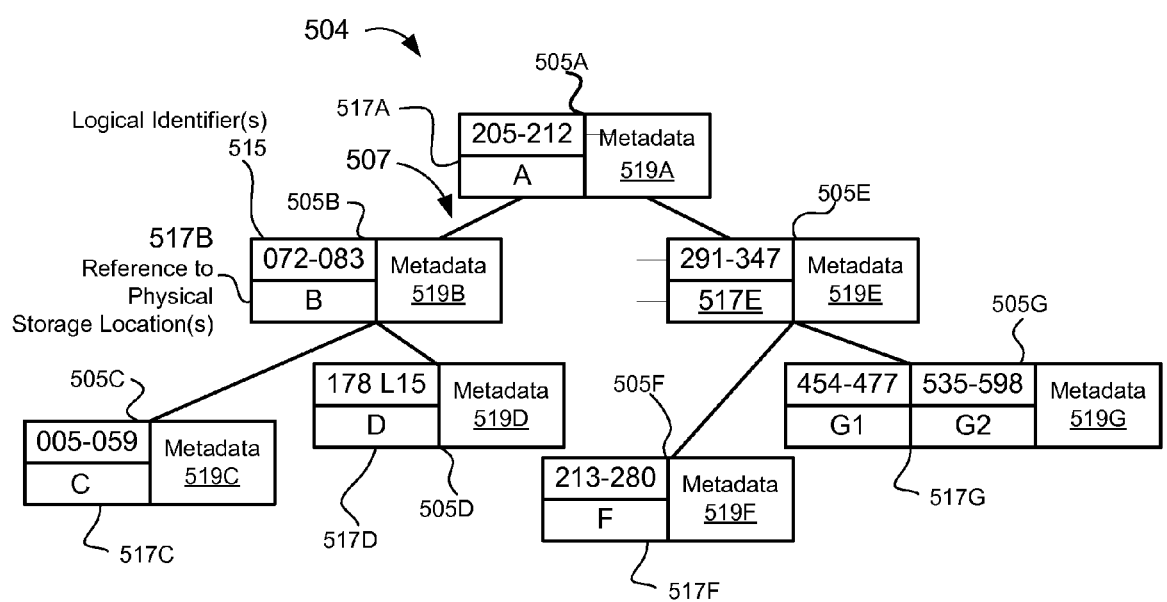
FIG. 5 depicts one embodiment of a forward index.

FIG. 5 depicts one example of storage metadata and, in particular, a forward index 504 that maintains allocations of the logical address space of one or more non-volatile storage devices (e.g., storage devices 106 described above). The forward index 504 may be further configured to maintain assignments between allocated logical identifiers and physical storage locations on a non-volatile storage device. The forward index 504 may be maintained by the SL 430, a storage controller (e.g., storage controller 404, described above), and/or a driver (e.g., driver 118 described above), or the like.

In the FIG. 5 example, the data structure 504 is implemented as a range-encoded B-tree. The disclosure is not limited in this regard, however; the forward index 504 may be implemented using and suitable data structure including, but not limited to: a tree, a B-tree, a range-encoded B-tree, a radix tree, a map, a content addressable map (CAM), a table, a hash table, or other suitable data structure (or combination of data structures).

The forward index 504 comprises a plurality of entries 505 (entries 505A-G), each representing one or more logical identifiers in the logical address space. For example, the entry 505B references logical identifiers 515 (LIDs 072-083). Data may be stored sequentially or "out-of-place" on the non-volatile storage device and, as such, there may be no correspondence between logical identifiers and the physical storage locations. The forward index 504 maintains assignments between allocated logical identifiers and physical storage locations (e.g., using physical storage location references 517). For example, the reference 517B assigns the logical identifiers 515 (LIDs 072-083) to one or more physical storage locations of the non-volatile storage device. In some embodiments, the references 517 comprise a physical address on the non-volatile storage device. Alternatively, or in addition, the references 517 may correspond to a secondary data-structure (e.g., a reverse index), or the like. The references 517 may be updated in response to changes to the physical storage location of data (e.g., due to grooming operations, data refresh, modification, overwrite, or the like).

In some embodiments, one or more of the entries 505 may represent logical identifiers that have been allocated to a storage client, but have not been assigned to any particular physical storage locations (e.g., the storage client has not caused data to be written to the logical identifiers). The physical storage location reference 517 of an unassigned entry 505 may be marked as "null" or not assigned.

The entries 505 are arranged into a tree data structure by the edges 507. In some embodiments, the entries 505 are indexed by logical identifier, which provides for fast and efficient entry 505 lookup. In the FIG. 5 example, the entries 505 are arranged in logical identifier order such that the entry 505C references the "lowest" logical identifiers and 505G references the "largest" logical identifiers. Particular entries 505 are accessed by traversing the edges 507 of the forward index 504. In some embodiments, the forward index 504 is balanced, such that all leaf entries 505 are of a similar depth within the tree.

For clarity, the FIG. 5 example depicts entries 505 comprising numeric logical identifiers, however, the disclosure is not limited in this regard, and one of skill in the art will recognize that the entries 505 could comprise any suitable logical identifier representation, including, but not limited to: alpha-numerical characters, hexadecimal characters, binary values, text identifiers, hash codes, or the like.

The entries 505 of the index 504 may reference logical identifiers of variable size and/or length; a single entry 51205 may reference a plurality of logical identifiers (e.g., a set of logical identifiers, a logical identifier range, a noncontiguous set of logical identifiers, or the like). For example, the entry 505B represents a contiguous range of logical identifiers 072-083. Other entries of the index 504, may represent a noncontiguous set of logical identifiers; entry 505G represents logical identifiers 454-477 and 535-598, each assigned to respective physical storage locations by respective references 517G and 527G. The forward index 504 may represent logical identifiers using any suitable technique; for example, the entry 505D references logical identifier 178 and length 15, which corresponds to a range of logical identifiers 178-192.

In some embodiments, the entries 504 comprise and/or reference metadata 519, which may comprise metadata pertaining to the logical identifiers, such as age, size, logical identifier attributes (e.g., client identifier, data identifier, file name, group identifier), the underlying physical storage location(s), or the like. The metadata 519 may be indexed by logical identifier (through association with the respective entries 505) and, as such, the metadata 519 may remain associated with entry 505 regardless of changes to the location of the underlying physical storage locations of the data.

The index 504 may be used to efficiently determine whether the non-volatile storage device comprises a particular logical identifier. In one example, a storage client may request allocation of a particular logical identifier. If the index 504 comprises and entry 505 that includes the requested logical identifiers, the logical identifier(s) associated with the request may be identified as being already allocated. If the logical identifiers are not in the index, they may be allocated to the requester by creating a new entry 505 in the index 504. In another example, a storage client requests data of a particular logical identifier. The physical storage location of the data is determined by accessing the reference 517 to the physical storage location of the entry 505 comprising the logical identifier. In another example, a client modifies data pertaining to a logical identifier. In another example, a storage client modifies existing data of a particular logical identifier. The modified data is written sequentially to a new physical storage location on the non-volatile storage device, and the physical storage location reference 517 of the entry 505 in the index 504 is updated to reference the physical storage location of the new data. The obsolete data may be marked as invalid for reclamation in a grooming operation.

The forward index 504 of FIG. 5 maintains a logical address space and, as such, is indexed by logical identifier. As discussed above, entries 505 in index 504 may comprise references 517 to physical storage locations on a non-volatile storage device. In some embodiments, the references 517 may comprise physical addresses (or address ranges) of the physical storage locations. Alternatively, or in addition, the references 517 may be indirect (e.g., reference a secondary datastructure, such as a reverse index).

Figure 6:
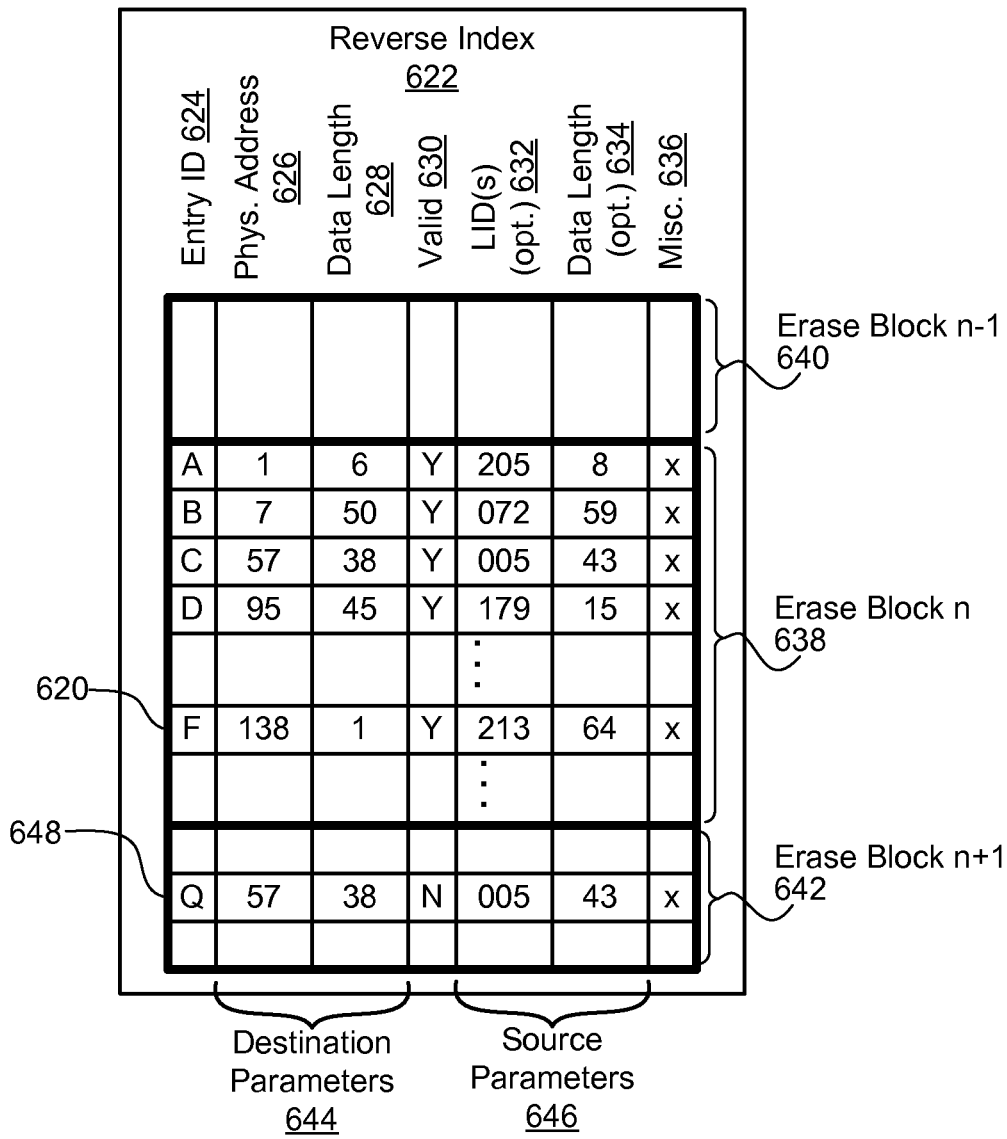
FIG. 6 depicts one embodiment of a reverse index.

FIG. 6 depicts one example of a reverse index 622 for maintaining metadata pertaining to physical storage locations of a non-volatile storage device. In the FIG. 6 example, the reverse index 622 is implemented as a table data structure. The disclosure is not limited in this regard, however, and could implement the reverse index 622 using any suitable datastructure. For example, in some embodiments, the reverse index 622 is implemented in the same data structure with the forward index 504 described above (e.g., portions and/or entries of the reverse index 622 may be included as leaf entries of the forward index 504). The index 622 comprises a plurality of entries 620 (depicted as rows in the table datastructure 622), each of which may comprise an entry ID 624, a physical address 626, a data length 628 associated with the data stored at the physical address 626 on the non-volatile storage media 410 (in this case the data is compressed), a valid tag 630, a logical address 632 associated with the data, a data length 634 associated with the logical address 632, and other miscellaneous data 636. In a further embodiment, the reverse index 622 may include an indicator of whether the physical address 626 stores dirty or clean data, or the like.

The reverse index 622 may be organized according to the configuration and/or layout of a particular non-volatile storage device. Accordingly, the reverse index 622 may be arranged by storage divisions (e.g., erase blocks), physical storage locations (e.g., pages), logical storage locations, or the like. In the FIG. 6 example, the reverse index 622 is arranged into a plurality of erase blocks (640, 638, and 642), each comprising a plurality of physical storage locations (e.g., pages, logical pages, or the like).

The entry 620 comprises metadata pertaining to the physical storage location(s) comprising data of the entry 505F of FIG. 5. The entry 620 indicates that the physical storage location is within erase block n 638. Erase block n 638 is preceded by erase block n−1 640 and followed by erase block n+1 642. (The contents of erase blocks n−1 and n+1 are not shown).

The entry ID 624 may be an address, a virtual link, or other data to associate entries in the reverse index 622 with entries in the forward index 504 (or other storage metadata). The physical address 626 indicates a physical address on the non-volatile storage device (e.g., non-volatile storage media 410). The data length 628 associated with the physical address 626 identifies a length of the data stored at the physical address 626. Together the physical address 626 and data length 628 may be referred to as destination parameters 644.

The logical identifier 632 and data length 634 may be referred to as source parameters 646. The logical identifier 632 associates the entry with a logical identifier of the logical address space. The logical identifier 632 may be used to associate an entry in the reverse index 622 with an entry 505 of the forward index 504. The data length 624 refers to the length of the data in the logical address space (e.g., from the perspective of the storage client). The source parameter 646 data length 634 may be different from the source parameter 644 data length 634 due to, inter alia, data compression, header overhead, encryption overhead, or the like. In the FIG. 6 example, the data associated with the entry 620 is highly compressible and was compressed from 64 blocks in the logical address space to 1 block on the non-volatile storage device.

The valid tag 630 indicates whether the data mapped to the entry 620 is valid. In this case, the data associated with the entry 620 is valid and is depicted in FIG. 6 as a "Y" in the row of the entry 620. As used herein, valid data refers to data that is up-to-date and has not been deleted and/or made obsolete (overwritten or modified). The reverse index 622 may track the validity status of each physical storage location of the non-volatile storage device. The forward index 504 may comprise entries corresponding to valid data only. In the FIG. 6 example, entry "Q" 648 indicates that data associated with the entry 648 is invalid. Note that the forward index 504 does not include logical addresses associated with entry Q 648. The entry Q 648 may correspond to an obsolete version of the data of entry 505C (overwritten by data now stored at entry "C").

The reverse index 622 may maintain entries for invalid data so that valid and invalid data can be quickly distinguished for storage recovery (e.g., grooming). In some embodiments, the forward index 504 and/or the reverse index 622 may track dirty and clean data in a similar manner to distinguish dirty data from clean data when operating as a cache.

In some embodiments, the reverse index 622 may omit the source parameters 646. For example, if the source parameters 646 are stored with the data, possibly in a header of the stored data, the reverse index 622 may identify a logical address indirectly by including a physical address 626 associated with the data and the source parameters 646 could be identified from the stored data.

The reverse index 622 may also include other miscellaneous data 636, such as a file name, object name, source data, storage client, security flags, atomicity flag, transaction identifier, or the like. One of skill in the art will recognize other information useful in a reverse index 622. While physical addresses 626 are depicted in the reverse index 622, in other embodiments, physical addresses 626, or other destination parameters 644, may be included in other locations, such as in the forward index 604, an intermediate table or data structure, or the like.

The reverse index 622 may be arranged by erase block or erase region (or other storage division) so that traversing a section of the index allows a groomer to identify valid data in a particular storage division (e.g., erase block 638) and to quantify an amount of valid data, or conversely invalid data, therein. The groomer may select storage divisions for recovery based, in part, on the amount of valid and/or invalid data in each division.

In some embodiments the groomer and/or garbage collection processes are restricted to operating within certain portions of the physical storage space. For example, portions of the storage metadata 434 may be periodically persisted on the non-volatile storage device 402, and the garbage collector and/or groomer may be limited to operating on the physical storage locations corresponding to the persisted storage metadata 434. In some embodiments, storage metadata 434 is persisted by relative age (e.g., sequence), with older portions being persisted, while more current portions are retained in volatile memory. Accordingly, the groomer and/or garbage collection systems may be restricted to operating in older portions of the physical address space and, as such, are less likely to affect data of in-process storage requests.

Referring back to FIG. 4, the non-volatile storage device 402 may be configured to store data on the non-volatile storage media 410 in a sequential, log-based format. The contents of the non-volatile storage device may, therefore, comprise an ordered "event log" of storage operations on the non-volatile storage media 410. The sequential ordering of storage operations may be maintained by appending data at an append point within the physical storage space of the non-volatile storage device 402. Alternatively, or in addition, sequence information may be maintained through persistent data stored on the non-volatile storage media 410. For example, each storage division (e.g., erase block) on the non-volatile storage media 410 may comprise a respective indicator (e.g., timestamp, sequence number, or other indicator), to indicate an order or sequence of the storage division within the event log.

Figure 7:
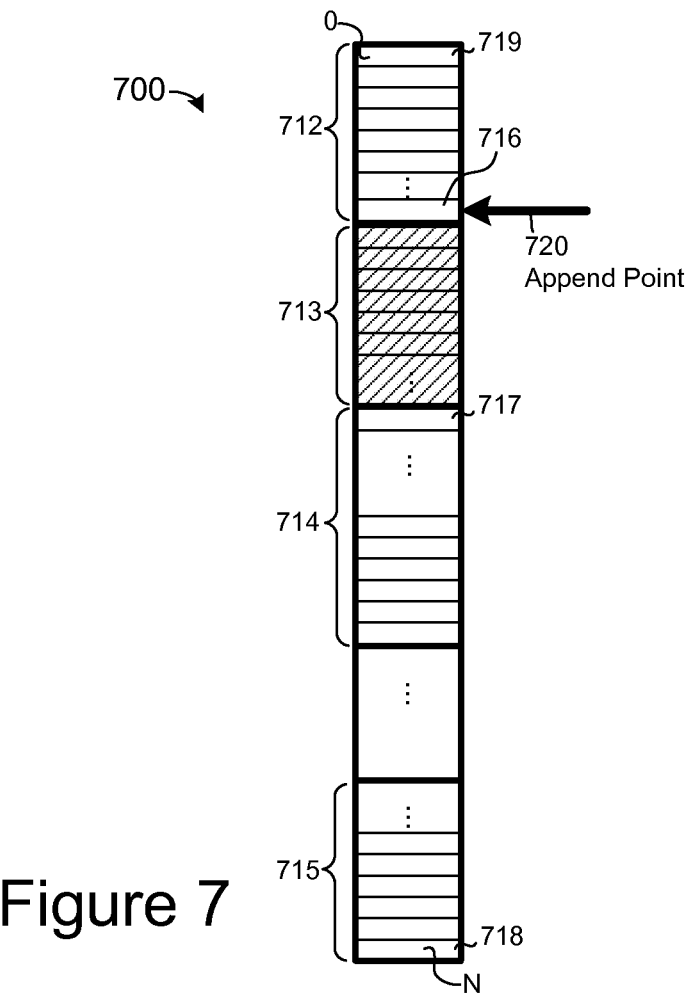
FIG. 7 depicts one embodiment of an append point within a physical storage space of a non-volatile storage device.

FIG. 7A depicts a physical storage space 700 of a non-volatile storage media (e.g., non-volatile storage media 410). The physical storage space 700 is arranged into storage divisions (e.g., erase blocks), each storage division comprising a plurality of physical storage locations (e.g., pages or logical pages) capable of storing data. The pages of a storage division may be initialized (e.g., erased) as a group.

Each physical storage location may be assigned a respective physical address ranging from zero (0) to N. Data is stored sequentially at an append point 720. The append point 720 may move sequentially through the physical storage space 700. After storing data at the append point 720 (storage location 716), the append point advances sequentially to the next available physical storage location. As used herein, an available physical storage location refers to a physical storage location that has been initialized and is ready to store data (e.g., has been erased). Some non-volatile storage media, such as non-volatile storage media 410, can only be programmed once after erasure. Accordingly, as used herein, an available physical storage location may refer to a storage location that is in an initialized (e.g., erased) state. If the next storage division in the sequence is unavailable (e.g., comprises valid data, has not been erased or initialized, is out of service, etc.), the append point 720 selects the next available physical storage location. In the FIG. 7A example, after storing data on the physical storage location 716, the append point 720 may skip the unavailable storage division 713, and continue at the next available location (e.g., physical storage location 717 of storage division 714).

After storing data on the "last" storage location (e.g., storage location N 718 of storage division 815), the append point 720 wraps back to the first division 712 (or the next available storage division if 712 is unavailable). Accordingly, the append point 720 may treat the physical address space as a loop or cycle.

Referring back to FIG. 4, storing data in a sequential, log-based format may comprise persisting metadata on the non-volatile storage media 410, which describes the data stored thereon. The persistent metadata may comprise the logical identifier associated with the data and/or provide sequence information pertaining to the sequential ordering of storage operations performed on the non-volatile storage media 410. Accordingly, the sequential, log-based data may represent an "event log" that tracks the sequence of storage operations performed on the non-volatile storage device 402.

Figure 8:
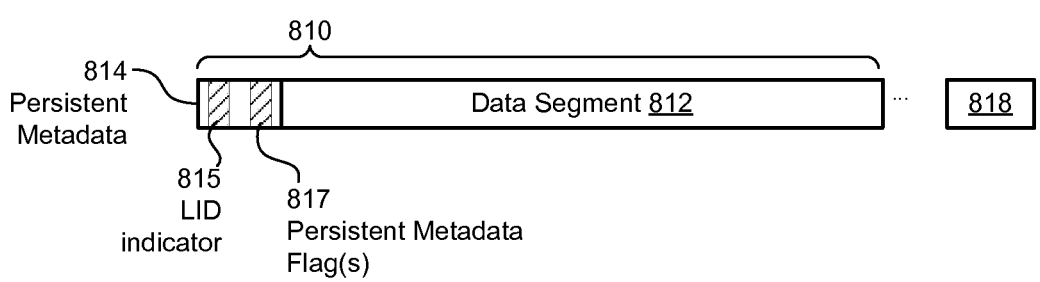
FIG. 8 depicts one example of a sequential, log-based format.

FIG. 8 depicts one example of a sequential, log-based data format (packet format 810). A data packet 810 includes a data segment 812 comprising data of one or more logical identifiers. In some embodiments, the data segment 812 comprises compressed, encrypted, and/or whitened data. As used herein, "whitened data" refers to data that is biased, encoded, and/or otherwise configured to have a certain pattern and/or statistical properties. Furthermore, the data segment 812 may be encoded in one or more error-correcting code datastructures (e.g., ECC codewords) and/or symbols. The data segment 812 may be a predetermined size (e.g., a fixed "block" or "segment" size). Alternatively, the data segment 812 may be a variable size.

The packet 810 includes persistent metadata 814 that is stored on the non-volatile storage media. In some embodiments, the persistent metadata 814 is stored with the data segment 812 (e.g., as a packet header, footer, or the like). The persistent metadata 814 may include a logical identifier indicator 815 that identifies the logical identifier(s) to which the data segment 812 pertains. The logical identifier indicator 815 may be used to reconstruct storage metadata, such as the forward index (e.g., forward index 504) and/or reverse index (e.g., reverse index 622). The persistent metadata 814 may further comprise one or more metadata flags 817. As discussed below, the flags 817 may be used to support atomic storage operations, transactions, cache operations, or the like.

In some embodiments, the packet 810 is associated with a sequence indicator 818. The sequence indicator 818 may be persisted on the storage location (e.g., page) with the packet 810 and/or on the storage division (e.g., erase block) of the packet 810. Alternatively, the sequence indicator 818 may be persisted in a separate storage location. In some embodiments, a sequence indicator is applied when a storage division is made available for use (e.g., when initialized, erased, when the first or last storage location is programmed, or the like). The sequence indicator 818 may be used to determine the sequential ordering of storage operations on the non-volatile storage device. The sequential, log-based data format provides an "event log" of storage operations on the non-volatile storage device (e.g., non-volatile storage device 402).

Referring back to FIG. 4, the sequential, log-based format disclosed herein enables the SL 430 to reconstruct the storage metadata 434, as well as other data, in the event of an invalid shutdown (or other event resulting in a loss of a portion of the storage metadata 434).

As discussed above, the storage metadata 434 (e.g., the forward index 504 of FIG. 5) maintains any-to-any assignments between logical identifiers and physical storage locations on the non-volatile storage device. Accordingly, there may be no pre-determined mapping between logical identifiers and physical storage locations on the non-volatile storage media 410; data of a logical identifier may be stored on any arbitrary physical storage location of the non-volatile storage media 410.

As discussed above, the storage metadata 434 may be reconstructed from the sequential, log-based data stored on the non-volatile storage device 402. The up-to-date version of data is identified based upon the location of the append point and/or sequence indicators associated with the data. During reconstruction, data pertaining to an incomplete atomic storage request may be identified (and discarded) using persistent metadata associated with the data, as depicted in FIG. 8.

In some embodiments, the system 400 may comprise a cache layer 440 that is configured to cache data of a backing store 460 using the non-volatile storage device 402. The backing store 460 may comprise one or more hard disks, network attached storage (NAS), a storage area network (SAN), or other persistent store. The backing store 460 may comprise a plurality of physical storage locations 461 capable of storing data of the storage clients 412. The backing store 460 may be communicatively coupled to a bus 421 of the computing device 401. Alternatively, or in addition, the backing store 460 may be communicatively coupled to the computing device 401 (and SL 430) via a network 420.

The cache layer 440 may be configured to leverage the SL 430 to cache data of the backing store 460 on the non-volatile storage media 410. In some embodiments, the SL 430 is configured to provide a logical address space 432 corresponding to an address space of the backing store 460. The logical address space 432 may, therefore, correspond to the physical storage locations 461 of the backing store 461. Accordingly, the SL 430 may maintain storage metadata 434 to associate logical identifiers of the backing store 460 with storage locations of cache data on the non-volatile storage media 410 (e.g., physical storage locations on the non-volatile storage device 402). The logical address space 432 may have a logical capacity that is equivalent to a physical storage capacity of the backing store 460. Alternatively, the logical address space 432 may be "sparse," such that it exceeds the physical storage capacity of the backing store 460. The logical capacity of the logical address space 432 (as well as the physical capacity of the backing store 460) may exceed the physical storage capacity of the non-volatile storage device 402. The SL 430 may manage allocations of the logical address space 432 and the physical storage capacity of the non-volatile storage media 402, as described above. In some embodiments, the SL 430 may provide a plurality of logical address spaces 432, each corresponding to a different backing store 460 and/or different storage client 412. The SL 430 may maintain separate storage metadata 434 for each logical address space 432.

The cache layer 440 may leverage the logical address space 432 and storage metadata 434 maintained by the SL 430 to cache data of the backing store 460. The cache layer 440 may reference cache data on the non-volatile storage media 410 using logical identifiers of the backing store 460 (through the logical address space 432 of the SL 430). Accordingly, the cache layer 440 may not have to maintain its own storage metadata; the cache layer may not maintain a separate index to associate logical identifiers of the backing store 460 with cache storage locations on the non-volatile storage media 410. By leveraging the logical address space 432 and storage metadata 434 of the SL 430, the overhead of the cache layer 440 may be significantly reduced.

The cache layer 440 may selectively admit data of the backing store 460 into a cache. As used herein, "admitting" data into the cache refers to caching the data on the non-volatile storage media 410. Data may be admitted into the cache in response to a data access that results in a cache miss (e.g., data pertaining to the request is not available on the non-volatile storage device 402—either a read miss or a write miss). Data may be admitted in response to determining that the data is suited for caching (e.g., will not poison the cache). As used herein, data that is suitable for caching refers to data that is likely to be subsequently accessed by one or more storage clients 412. By contrast, "poisoning" a cache refers to admitting data into the cache that is unlikely to be subsequently requested by a storage client 412 (e.g., "single-use" data). As used herein, a data access refers to any operation relating to data, including, but not limited to: a read, write, modify, truncate, or the like.

The cache layer 440 may make cache admission decisions based upon access metadata 442. The access metadata 442 may comprise information pertaining to data access characteristics of logical identifiers within the logical address space 432 presented by the SL 430. The access metadata 442 may be separate from the storage metadata 434 of the SL 430. Accordingly, the access metadata 442 may be maintained in datastructures that are separate and/or distinct from the storage metadata 434 (e.g., separate and/or distinct from the forward index, reverse index, and so on).

The access metadata 442 may comprise information pertaining to access characteristics across the entire logical address space 432 presented by the SL 430. Accordingly, the access metadata 442 may comprise access metadata pertaining to "cached" logical identifiers as well access metadata pertaining to "non-cached" logical identifiers. As used herein, a "cached" logical identifier refers to a logical identifier of data that is cached on the non-volatile storage media 410. A "non-cached" logical identifier refers to a logical identifier of data that is not currently cached on the non-volatile storage media 410. Unlike a traditional "least-recently-used" cache metrics, the access metadata 442 may be used to identify data suitable for caching regardless of whether the data is presently in the cache.

The cache layer 440 may be configured to update the access metadata 442 in response to data accesses within the logical address space 432. Updating the access metadata 442 may comprise including an indication of the access request in the access metadata 442. In some embodiments, the cache layer 440 comprises a cache admission module 444 that is configured to make cache admission decisions using the cache access metadata 442 (e.g., identify data that is suitable for caching). In some embodiments, the cache admission module 444 may determine an access metric of a logical identifier in response to a cache miss (e.g., a data access request pertaining to the logical identifier), and may admit the data into the cache when the access metric of the data satisfies an "access threshold," or other admission criteria. As used herein, an "access metric" of a logical identifier refers to any value for quantifying the access characteristics of the logical identifier (e.g., access frequency, etc.). An access metric may comprise, but is not limited to: a binary value indicating an access to a logical identifier within a pre-determined interval, an ordered set of such binary values, one or more counter values, or the like. As used herein, an "access threshold" refers to one or more pre-determined or dynamic thresholds, and "admission criteria" refers to any pre-determined or dynamic criteria (e.g., thresholds) for selectively admitting data into the cache.

In some embodiments, data that does not satisfy the admission criteria (e.g., the access threshold), may be admitted into the cache as "low-value" data. As used herein, "low-value" refers to data that may be admitted into the cache despite failing to satisfy the cache admission criteria. Low-value data may be admitted into the cache in response to the access metric satisfying less stringent cache admission criteria (e.g., a lower access threshold). Admission of low-value data may be predicated on the availability of cache capacity, or other performance factors. Low-value data may be evicted from the cache before other, higher-value data (e.g., data that satisfied the admission criteria). Accordingly, low-value data may be marked within the cache; admitting low-value data into the cache may comprise identifying the data as "low-value" on the non-volatile storage media 410 and/or other cache metadata. The indication may comprise persistent metadata as described above in conjunction with FIG. 8. Alternatively, or in addition, the indication may be included in volatile cache and/or storage metadata maintained by the cache layer 440 and/or SL 430.

Figure 9A:
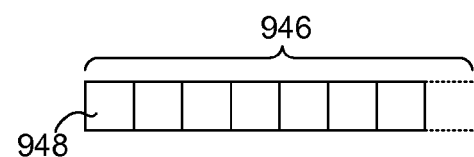
FIG. 9A depicts one example of an access datastructure of cache access metadata.

FIG. 9A depicts one example of access metadata. In the FIG. 9A example, the access metadata 442 comprises an access datastructure 946, comprising a plurality of entries 948, each comprising access characteristics of respective logical identifiers in a logical address space, such as the logical address space 432, described above. Accordingly, the datastructure 946, in some embodiments, may represent the entire address space of the backing store 460; the datastructure 946 may comprise an entry 948 representing each physical storage location 461 of the backing store 460. The entries 948 of access datastructure 946 taken together may correspond to all logical identifiers in the address space (and physical storage locations 461 of the backing store 460), including both "cached" and "non-cached" logical identifiers. The access datastructure 946 may be sparse, such that entries 948 (or ranges of entries 948) are created as needed. Accordingly, entries representing certain ranges of the logical address space (e.g., tail-end of the logical address space) may never be created and/or allocated.

In some embodiments, the access datastructure 946 may comprise a bitmap (or bit array) with each entry 948 comprising a single bit. The bit values may indicate whether one or more data accesses pertaining to the logical identifier(s) of the entry 948 occurred during a particular interval. The datastructure 946 may be "reset" at the expiration of an interval. As used herein, "resetting" an access datastructure 946 refers to clearing access indications from the access datastructure 946 (e.g., resetting the entries 948 to a "0" value). Accordingly, a "1" value may indicate that one (or more) data accesses occurred during the interval, and a "0" value may indicate that no data accesses occurred during the interval.

In another example, the entries 948 may comprise a multi-bit counters to quantify the number of access requests during the interval. The counters may be reset (or decremented) at the expiration of an interval (e.g., a clock sweep interval). Accordingly, the value of a counter may indicate the number (or frequency) of accesses pertaining to logical identifier(s) of the entry 948 over the interval.

Referring back to FIG. 4, the cache layer 440 may be configured to selectively admit data into the cache based upon an access metric of the logical identifier corresponding to the data. The access metric may be derived from the access metadata 442, as described above. In some embodiments, the access metric may comprise a bitwise indication of whether data of the logical identifier was accessed during an interval. Alternatively, the access metric may comprise an access count associated with the logical identifier. The cache layer 440 may compare the access metric to an access threshold, and may admit the data into the cache when the access metric satisfies the access threshold. The comparison may comprise determining whether a bit value corresponding to the logical identifier indicates a data access and/or may comprise comparing a multi-bit counter value to a multi-bit access threshold value.

Figure 9B:
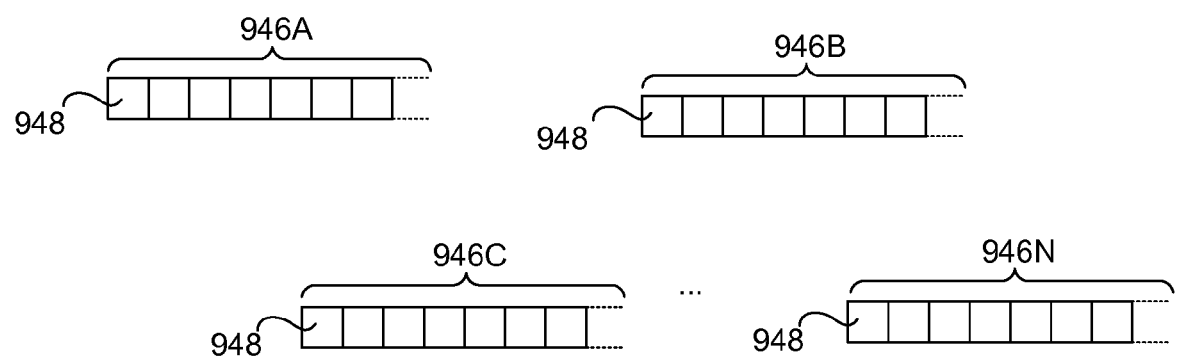
FIG. 9B depicts an example of an ordered set of access datastructures of cache access metadata.

In some embodiments, the access metadata 442 may comprise an ordered set of access datastructures 946. FIG. 9B depicts an ordered set of access datastructures 946A-N, including a "current" access datastructure 946A and one or more "previous" access data structures 946B-N. Each access datastructure 946A-N may comprise respective entries 948 comprising access characteristics of one or more logical identifiers, as described above.

The current access data structure 946A may be actively updated in response to data accesses during a current interval. The one or more previous access data structures 946B-N may comprise access characteristics of previous intervals, and may not be actively updated during the current interval. Upon expiration of the current interval, the access datastructures 946A-N may roll-over; a "reset" datastructure may replace the current datastructure 946A, the current access datastructure 946A may be designated as a previous datastructure 946B (e.g., replace former 946B), datastructure 946B may replace 946C, and so on. A last data structure 946N may be removed (or reset and designated as the current data structure 946A).

An access metric of a logical identifier may be determined by combining entries of the access datastructures 946A-946N. In some embodiments, the combination may comprise an additive operation, such as a logical OR operation, such that the access metric reflects any access across the data structures 946A-N. If the access datastructures are updated at an interval "T," a logical OR combination indicates any access occurring during an N*T interval. An additive combination may indicate an access frequency during the N*T interval.

In some embodiments, the combination may comprise a bitwise combination of entries 948 of two or more datastructures 946A-N. The combination may comprise any suitable combination including, but not limited to: a logical AND, OR, XOR, or the like. Similarly, the combination may comprise a summation or product of entries 948 of two or more datastructures 946A-N. In some embodiments, the combination may comprise weighting access characteristics according to their recency; recent access characteristic may be weighted more heavily than older access characteristics. Accordingly, when determining the access metric of a logical identifier, the access characteristics of more recent entries (e.g., entries 948 of access datastructure 946A) may be given more weight than the access characteristics of older datastructures 946B-N. Determining the access metric may comprise multiplying the access characteristics by a recency factor (e.g., by left shifting an access characteristic bit or counter value), as illustrated in Eq. 1 below:

$$AM = \sum_{i=o}^{N-1} R_i \cdot AC_i \quad \text{Eq. 1}$$

In Equation 1, the access metric (AM) is a weighted combination of the access characteristics ($AC_i$) of respective entries 948 in the access datastructures 946A-N. The current access characteristic zero (0) ($AC_0$) may correspond to an entry 948 in the current access datastructure 946A, the access characteristic one (1) ($AC_1$) may correspond to an entry 948 of the "next most recent" access datastructure 946B, and the access characteristic N−1 ($AC_{N-1}$) may correspond to access characteristics of an entry 948 of the "oldest" access datastructure 946N, and so on. The recency weighting factors ($R_i$) may vary according to the relative recency of the access characteristics $AC_i$; the recency factor ($R_0$) applied to the access characteristic of the current access datastructure 946A ($AC_0$) may be greater than the recency factor ($R_{N-1}$) applied to the access characteristic of "older" access datastructures 946B-N.

In another example, the access metric (AM) of a logical identifier may be determined by "left shifting" one or more access characteristics ($AC_i$) of respective entries 948 in the access datastructures 946A-N as follows:

$$AM = \sum_{i=0}^{N-1} AC_i \ll (N - i) \quad \text{Eq. 2}$$

In Equation 2, the access metric (AM) is a weighted combination of the access characteristics ($AC_i$) of respective entries 948 in the access datastructures 946A-N; as above, access characteristic $AC_0$ corresponds to an entry 948 in the current access datastructure 946A, and access characteristic N−1 ($AC_{N-1}$) corresponds to access characteristics of an entry 948 of the "oldest" access datastructure 946N. The access characteristic ($AC_0$) of the current access datastructure 946A may be weighted heavily (left shifted by N−1), whereas entries 948 of older access datastructures 946B-N are given less weight (e.g., shifted by N−i); in Equation 2, the access characteristics of the oldest access datastructure 946N are not weighted (e.g., are given the least amount of weight in the combined access metric). In embodiments in which the datastructures 946A-N comprise bitmaps (e.g., each entry 948 comprises a single bit), the summation of Equation 2 may comprise a logical OR operation. Although particular techniques for determining access metrics are described herein, the disclosure is not limited in this regard and could be adapted to combine and/or weight access characteristics in any suitable manner.

Referring back to FIG. 4, as described above, the cache layer 440 maintains access metadata 442 to track access characteristics of logical identifiers within the logical address space 432. The access metadata 442 may comprise one or more access datastructure(s) comprising entries corresponding to the access characteristics of one or more of the logical identifiers. In some embodiments, the cache layer 440 tracks access characteristics of each logical identifier separately, such that there is a one-to-one correspondence between logical identifiers and entries in the access metadata 442. In other embodiments, the access metadata 442 may track access characteristics of groups of logical identifiers, such that each entry corresponds to access characteristics of a plurality of logical identifiers. The cache layer may map logical identifiers to entries in the access metadata 442 using any suitable mechanism including, but not limited to: a hash mapping, a range mapping, a hybrid mapping, or the like. Accordingly, in some embodiments, the cache layer 440 comprises a mapping module 445 that is configured to map logical identifiers to entries in the access metadata 1032.

Figure 10A:
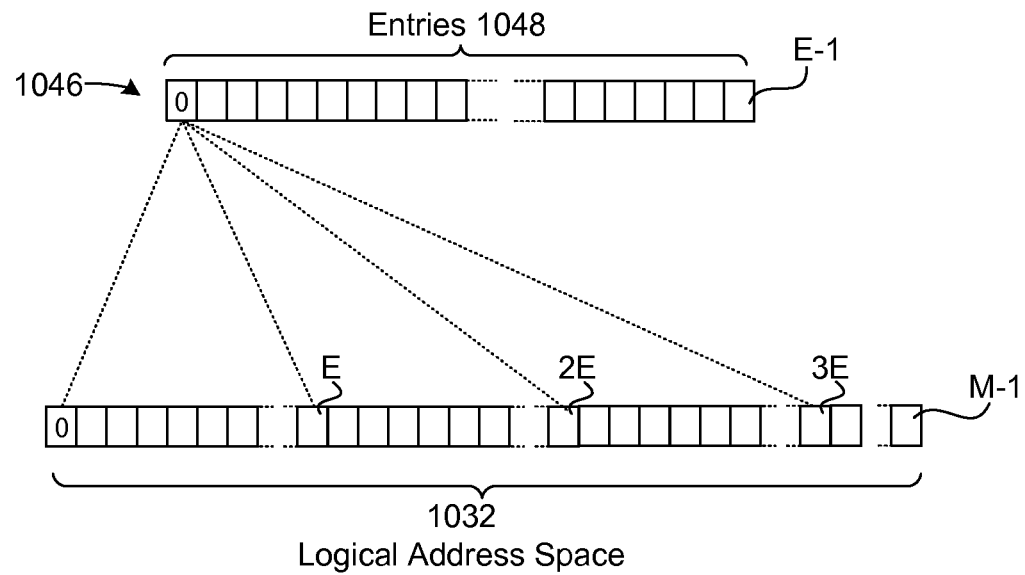
FIG. 10A depicts an exemplary hash-based mapping between logical identifiers and access metadata.

FIG. 10A depicts one example of a hash-based mapping between logical identifiers of a logical address space 1032 and entries 1048 of an access datastructure 1046. In the FIG. 10A example, the logical address space 1032 comprises M logical identifiers (0 to M−1), and the access datastructure 1046 comprises E entries (0 to E−1). The hash mapping maps every ((k*E)+i) logical identifier to bitmap index i, where k is a ratio of the size of the logical address space M to the number of entries E in the access datastructure 1046. Accordingly, the entry of a logical identifier may be determined by the index of the logical identifier modulo the number of entries (E) in the access datastructure 1046. As shown in FIG. 10A, the logical identifiers 0, E, 2E, and 3E, all map to the same entry 0 in the access datastructure 1046. Similarly, logical identifiers 1, E+1, 2E+1, and 3E+1, all map to the same entry, and so on. In the FIG. 10A example, the ratio of logical identifiers to entries 1048 is 4 to 1, such that four (4) logical identifiers map to each entry 1048.

Figure 10B:
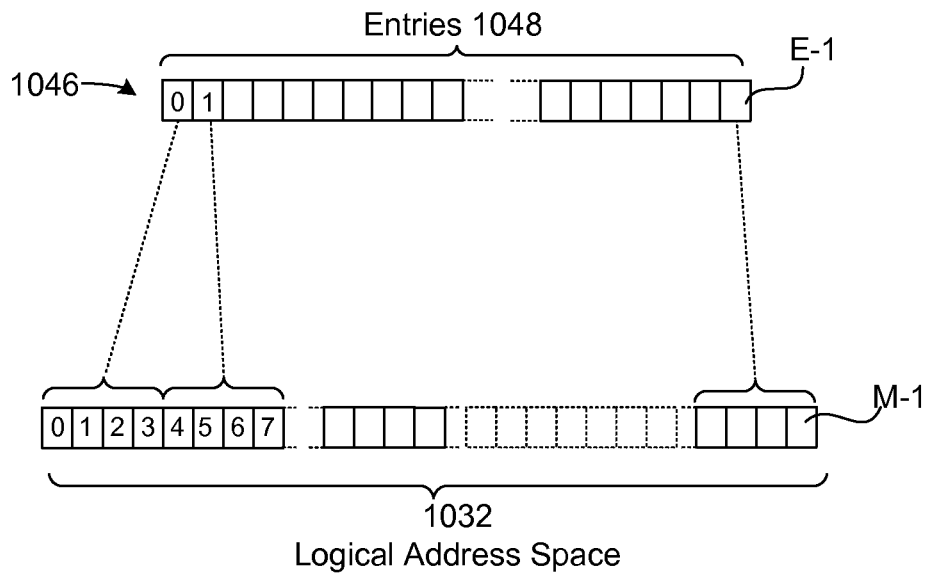
FIG. 10B depicts an exemplary range-based mapping between logical identifiers and access metadata.

FIG. 10B depicts an example of a range-based mapping between logical identifiers of a logical address space 1032 and entries 1048 of an access datastructure 1046. The range-based mapping of FIG. 10B maps ranges of contiguous logical identifiers to respective entries 1048 based upon a ratio of logical address space M to entries E. In the FIG. 10B example, the ratio of M to E is four-to-one. Accordingly, logical identifiers 0 to 3 map to entry 0, logical identifiers 4 to 7 map to entry 1, and so on with entries M−4 to M−1 mapping to entry E−1.

Figure 10C:
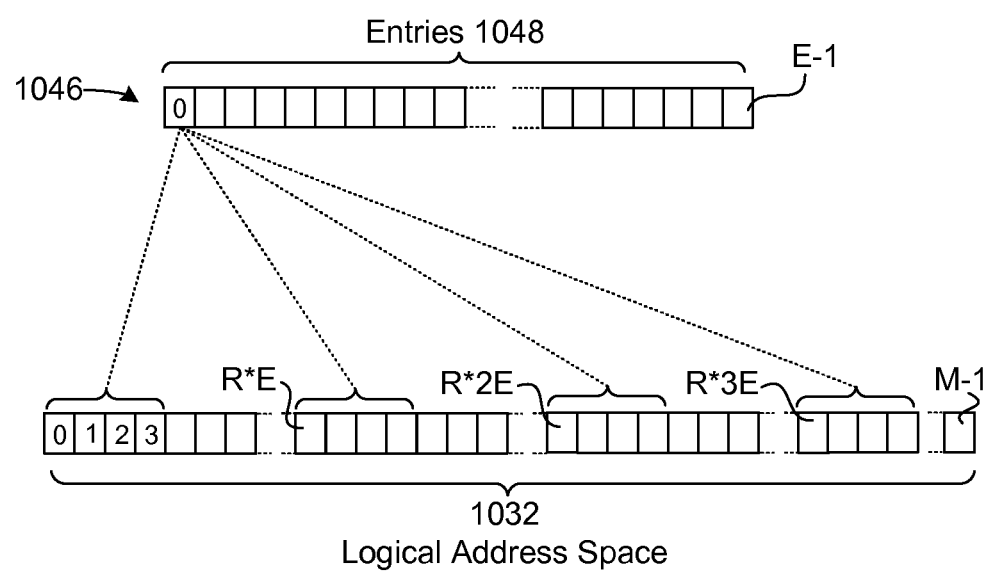
FIG. 10C depicts an exemplary hybrid mapping between logical identifiers and access metadata.

FIG. 10C depicts an example of a hybrid mapping between logical identifiers of a logical address space 1032 and entries 1048 of an access datastructure 1046. The hybrid mapping maps logical identifiers from (i*E) to ((i+1)*E−1) to entry 1048 i. Accordingly, the hybrid mapping maps a plurality of logical identifier ranges to the same entry 1048. In the FIG. 10C example, there is a sixteen-to-one ratio between logical identifiers and entries 1048 in the access datastructure 1046. The hybrid mapping maps four (4) ranges of four (4) logical identifiers to each entry 1048. A first range starting with logical identifier 0 maps to entry 0, along with other ranges starting with logical identifier R*E, 2*R*E, and 3*R*E, where R is the range size (four) and E is the size number of entries 1048. The ratio of range size and/or hash overlap may be adjusted by testing and experience. In another example, the sixteen-to-one ratio of FIG. 10C could be implemented using a different range size, resulting in a different hash mapping (e.g., two (2) overlapping ranges of eight (8) logical identifiers).

Although particular mappings are described herein, the disclosure is not limited in this regard and could be adapted to incorporate any suitable mapping between the logical address space 1032 and access datastructure 1046. Moreover, the disclosure may be adapted to use access datastructures 1046 having any suitable ratio between the logical address space 1032 and the entries 1048.

Figure 11:
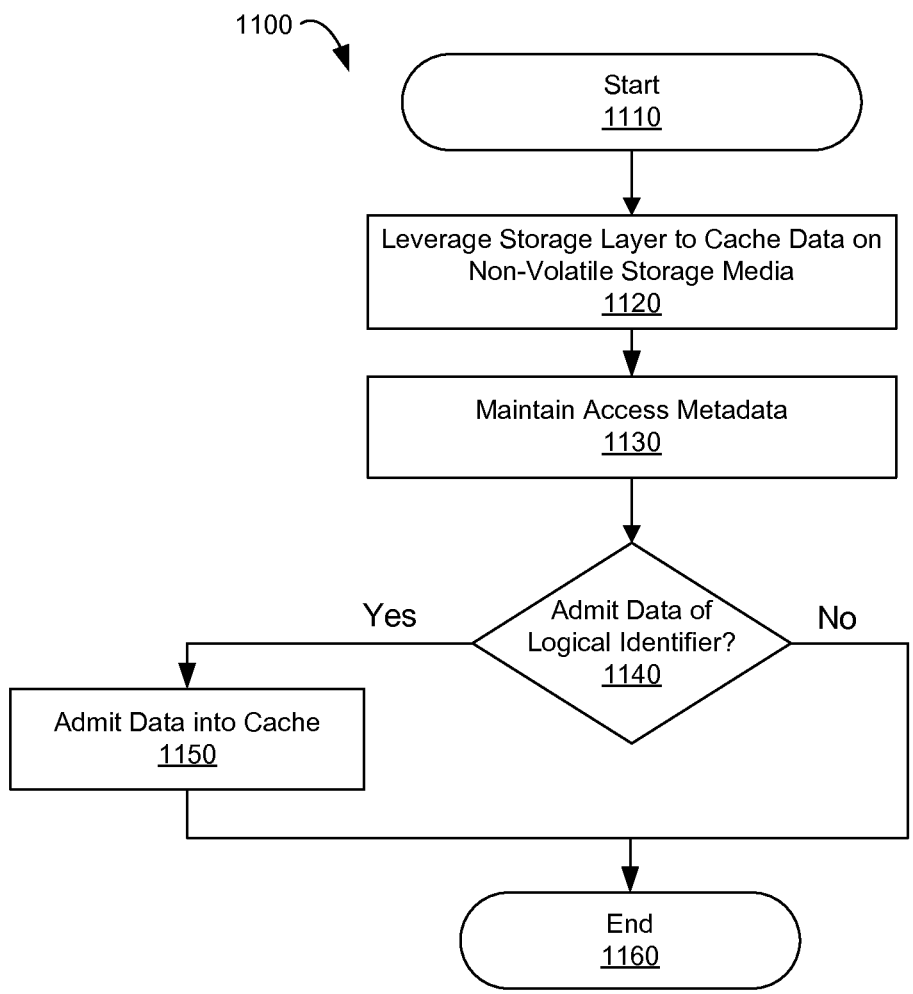
FIG. 11 is a flow diagram of one embodiment of a method for managing cache admission.

FIG. 11 is a flow diagram of one embodiment of a method 1100 for managing cache admission. The method 1100, as well as the other methods and/or processes disclosed herein, may be implemented within and/or in conjunction with a computing device, such as the computing device 401 described above. In some embodiments, steps of the method 1100 may be implemented in a driver or other driver, storage and/or caching layer of a computing device. Accordingly, portions of the method 1100 may be implemented as computer-readable instructions or modules operating on a processor of a computing device (e.g., SL 430 and/or computing device 401 of FIG. 4). The instructions and/or modules of the method 1100 may be stored on a computer-readable storage medium.

The method 1100 starts and is initialized at step 1110. Step 1110 may comprise initializing and/or allocating resources to manage a cache on a non-volatile storage device (e.g., non-volatile storage device 402), which may include, but are not limited to: storage layers, such as the SL 430, communications interfaces (e.g., bus 421, network 420, and so on), allocating volatile memory, and so on. The initialization may further comprise configuring a storage layer to present a logical address space corresponding to a backing store, as described above.

Step 1120 comprises caching data corresponding to a backing store 460 on a non-volatile storage media 410. Step 1120 may comprise caching the data using a storage layer, such as the SL 430. Accordingly, step 1120 may comprise leveraging storage metadata to cache data, such as an index comprising assignments between logical identifiers and physical storage locations on the non-volatile storage media 410.

Step 1130 comprises maintaining access metadata pertaining to data accesses within the logical address space. The access metadata may be separate and/or distinct from the storage metadata of the storage layer (e.g., SL 430). The access metadata may comprise one or more bitmaps, the bitmaps comprising entries (e.g., bits) corresponding to one or more logical identifiers. Step 1130 may comprise updating the access metadata in response to data accesses within the logical address space. Updating the access metadata may comprise identifying an entry corresponding to a data access (e.g., using a mapping, as described above) and updating access characteristics of the entry (e.g., flipping a bit, incrementing a counter, or the like). In some embodiments, the access metadata comprises an ordered set of access datastructures (e.g., datastructures 946A-N). Step 1130 may comprise designating a current datastructure and/or "rolling over" the datastructures at a pre-determined interval.

Step 1140 comprises determining whether to admit data of a logical identifier into the cache. The determination of step 1140 may be made in response to an access request pertaining to data that is not in the cache (e.g., a cache miss). Step 1140 may comprise determining an access metric of the logical identifier, as described above. Step 1140 may comprise identifying one or more entries corresponding to the logical identifier (using a one-to-one or other mapping, as described above), determining an access metric of the logical identifier using access characteristics of the one or more entries, and comparing the access metric to an access threshold. In response to the access metric satisfying the access threshold, the flow may continue to step 1150; otherwise, the flow may end at step 1160.

In some embodiments, at step 1140 comprises determining whether to admit the data as "low-value" data. As discussed above, if the access metric of a logical identifier does not satisfy the access threshold (or other admission criteria), the data may be admitted as "low-value" data. The data may be admitted as low-value data in response to the access metric satisfying a lower access threshold and/or may be admitted regardless of the access metric. The low-value data may be marked on the non-volatile storage media 410 and/or the cache metadata 442.

Step 1150 comprises admitting the data into the cache. Admitting the data may comprise storing the data on a nonvolatile storage device (e.g., non-volatile storage device 402). Step 1150 may further comprise leveraging storage metadata of a storage layer, such as the SL 430, to associate the logical identifier with a physical storage location, as described above.

Referring back to FIG. 4, the cache layer 440 may be configured to pre-admit data into the cache. As discussed above, the cache admission module 444 may consider data for admission into the cache in response to a cache miss (e.g., a data access pertaining to data that is not stored on the non-volatile storage media 410). The cache admission module 444 may be further configured to consider other, "proximate" data for admission into the cache. As used herein, "proximate" data refers to data of a logical identifier that is within a proximity window of another logical identifier within the logical address space 432 (e.g., the "distance" between the logical identifiers is less than (or equal to) a proximity threshold).

Pre-admission may comprise the cache admission module 444 determining an access metric for one or more proximate logical identifiers, and admitting data of the logical identifiers into the cache in response to the access metric(s) satisfying a pre-admission access threshold. In some embodiments, the pre-admission access threshold may differ from the access threshold (e.g., be lower or higher than the access threshold). The pre-admission access threshold (as well as the access threshold, described above) may be tuned in accordance with the data access characteristics of the computing device 401 and/or storage clients 412. For example, a storage client 412 may operate on relatively large, contiguous data segments. In response, the pre-admission access threshold may be set lower than the access threshold to bias the cache admission module 444 towards pre-admitting contiguous data segments. By contrast, a cache servicing storage clients 412 that accesses data in relatively small, discontiguous segments may set the pre-admission access threshold as high (or higher) than the access threshold.

In addition, the proximity window of the cache admission module 444 may be tuned according to the access characteristics of the computing device 401 and/or storage clients 412. A large proximity window may expand the number of pre-admission candidates, whereas a smaller proximity window restricts the range of pre-admission candidates. In some embodiments, the cache admission manager 444 may apply a dynamic pre-admission access threshold that varies according to the proximity of a pre-admission candidate. The cache admission module 444 may apply lower pre-admission access thresholds to more proximate logical identifiers, and higher pre-admission access thresholds to less proximate logical identifiers.

Figure 12:
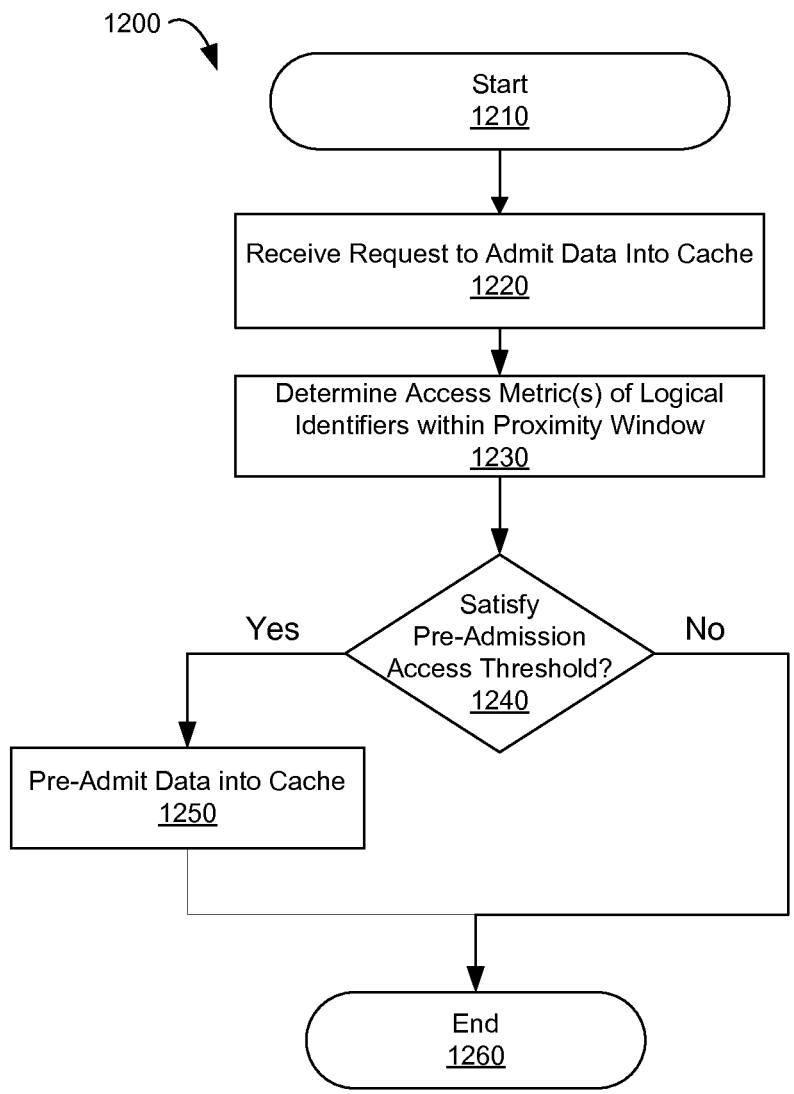
FIG. 12 is a flow diagram of another embodiment of a method for managing cache admission.

FIG. 12 is a flow diagram of one embodiment of a method 1200 for managing admission into a cache. At step 1210, the method 1200 starts and is initialized as described above. Step 1210 may further comprise caching data on a non-volatile storage device using a storage layer, and maintaining access metadata pertaining to data accesses in a logical address space, as described above.

Step 1220 may comprise receiving a request to admit data into the cache at a cache layer (cache layer 440). The request of step 1220 may be received in response to a cache miss (e.g., a data access pertaining to data that is not stored (and/or not up-to-date) on the non-volatile storage media 410).

Step 1230 may comprise determining an access metric of one or more logical identifiers within a proximity window of the data. Step 1230 may comprise identifying logical identifiers within a proximity window of the data in a logical address space (e.g., logical address space 432), and determining an access metric for each identified logical identifier, as described above. As described above, the proximity window may be tuned according to the data access characteristics of a computing device and/or one or more storage clients.

Step 1240 may comprise determining whether the access metric(s) of the one or more proximate logical identifiers satisfy a pre-admission access threshold. The pre-admission access threshold may be lower, higher, or equivalent to the cache admission access threshold described above. The pre-admission access threshold may be tuned according to the data access characteristics of a computing device and/or one or more storage clients. In some embodiments, the pre-admission access threshold is dynamic (e.g., proportional to a proximity of the logical identifier).

Logical identifiers having an access metric that satisfies the pre-admission threshold at step 1240 may be admitted into the cache at step 1250, as described above (e.g., data of the logical identifier(s) may be stored on the non-volatile storage media 410). Logical identifiers that do not satisfy the pre-admission access threshold may not be pre-admitted into the cache. The flow ends at step 1260 until a next request to admit data into the cache is received.

Referring back to FIG. 4, in some embodiments, the cache layer 440 comprises a sequentiality module 446 that is configured to identify data that is part of a sequential access. As used herein, a "sequential access" refers to data accesses that are sequential (or proximate) within the logical address space 432. As discussed above, sequential data accesses typically are "single-use" accesses, and as such, are likely to be unsuitable for caching (e.g., may poison the cache). Examples of sequential data accesses include, but are not limited to: streaming, backup applications, virus scanning applications, and so on.

The cache layer 440 may comprise a sequentiality module 446 that is configured to generate a sequentiality metric in response to a request to admit data into the cache (e.g., in response to a cache miss). The sequentiality metric may quantify a likelihood that the data is part of a sequential data access. The cache admission module 444 may use the sequentiality metric (along with the access metric, described above) to determine whether to admit the data into the cache.

Figure 13:
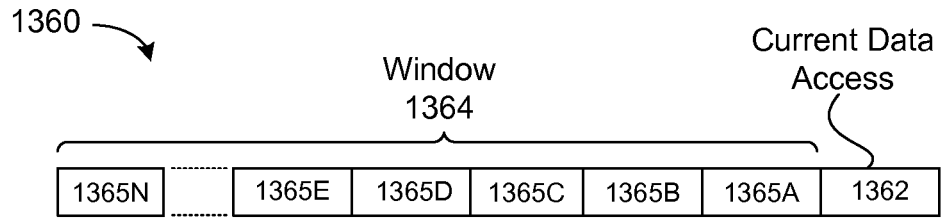
FIG. 13 depicts one example of an ordered sequence of data accesses for determining a sequentiality metric.

In some embodiments, the sequentiality module 446 maintains access metadata comprising an ordered sequence of data accesses. FIG. 13 depicts one example of an ordered sequence of data accesses 1360 comprising a current data access 1362, and a window 1364 comprising plurality of previous data accesses 1365A-N. The sequentiality metric of the current data access 1362 may be determined by comparing the logical identifier of the current data access 1362 to logical identifiers of the data accesses 1365A-N. In some embodiments, the sequentiality metric may comprise a binary sequentiality indicator, which is asserted if the logical identifier of any of the data accesses in the window 1364 is within a predetermined proximity threshold to the logical identifier of the current data access 1362.

In some embodiments, the sequentiality metric may comprise a multi-bit value quantifying the likelihood that the current data access 1362 is part of a sequential data access. The sequentiality metric may be incremented in response to identifying logical identifiers in the window 1364 that are within a proximity threshold of the current data access 1362. The sequentiality metric may be incremented in proportion to the proximity between the logical identifiers (e.g., the more proximate the logical identifiers are the more the sequentiality metric may be incremented). The sequentiality metric may remain unchanged (or be decremented), in response to logical identifiers in the window 1364 that are outside of the proximity threshold.

In some embodiments, the contribution of a data accesses 1365A-N to the sequentiality metric may be weighted by the relative ordering of the data accesses within the window 1364 (e.g., the temporal proximity of the data accesses 1365A-N to the current data access 1362). For example, the contribution of the data access 1365A may be more heavily weighted that previous data accesses 1365B-N, and so on.

In some embodiments, the size of the window 1364 (and/or the sequentiality threshold) may be adjusted in response to user preferences, performance monitoring, or the like. The window may be tuned according to data access characteristics of one or more storage clients (e.g., databases, file systems, etc.), processor configuration (e.g., number of processor cores, number of concurrent threads, etc.), or the like.

Figure 14:
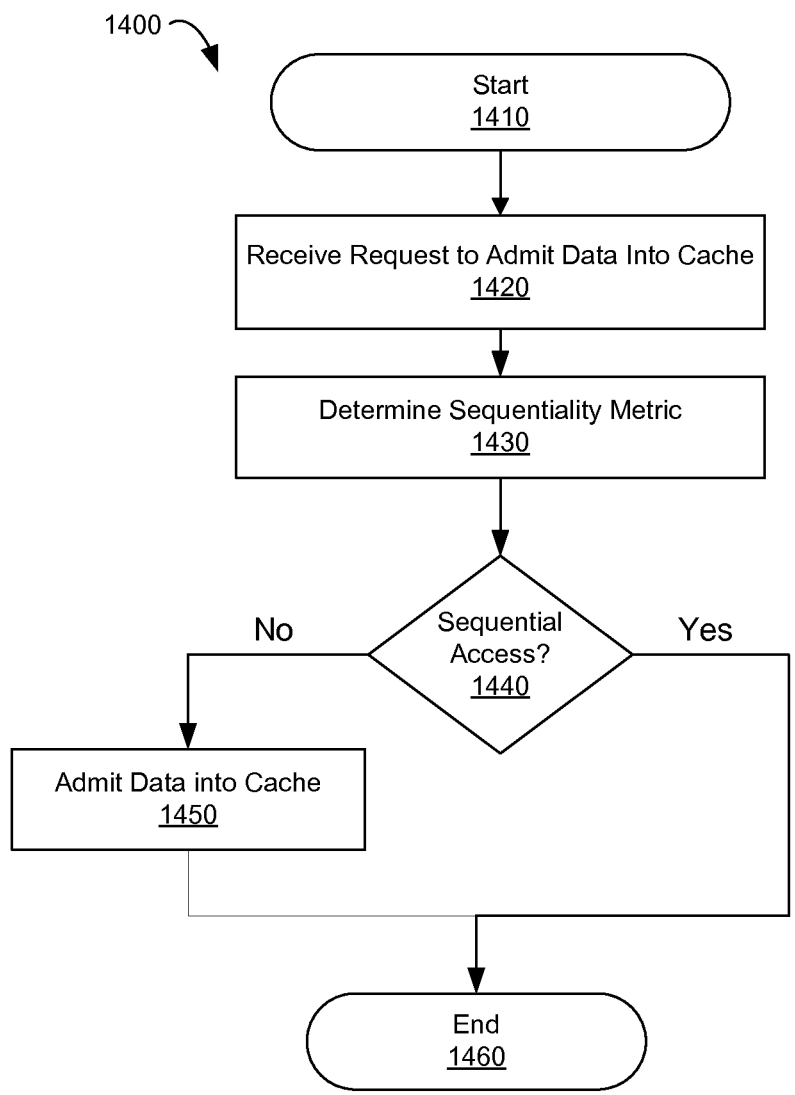
FIG. 14 is a flow diagram of one embodiment of a method for managing cache admission using a sequentiality metric.

FIG. 14 is a flow diagram of one embodiment for managing cache admission using access metadata. At step 1410, the method 1400 may start and be initialized as described above.

Step 1420 comprises receiving a request to admit data into the cache. The request of step 1420 may be received at a cache layer 440 in response to a data access resulting in a cache miss.

Step 1430 may comprise determining a sequentiality metric of the access request. Step 1430 may comprise maintaining a window comprising an ordered sequence of data accesses (e.g., ordered sequence 1364 maintained by the cache layer 440). The sequentiality metric may be determined by comparing the logical identifier of the data access to logical identifiers of data accesses within the window. A sequential data access may be identified and/or the sequentiality metric may be incremented in response to identifying logical identifiers in the window that are within a proximity threshold of the data access, as described above.

Step 1440 comprises determining whether the data access is part of a sequential data access. Step 1440 may, therefore, comprise comparing the sequentiality metric of step 1430 to a sequentiality threshold (e.g., evaluating the sequentiality metric to determine a likelihood that the data access is part of a sequential data access). If step 1440 indicates that the data access is not part of a sequential data access, the flow may continue to step 1450; otherwise, the flow may end at step 1460.

Step 1450 comprises admitting the data into the cache, which, as described above, may comprise storing the data on the non-volatile storage media 410 using the SL 430.

Referring back to FIG. 4, in some embodiments, the cache admission module uses both an access metric and sequentiality metric to determine whether to admit data into the cache. For example, even through data is part of a sequential data access, the data may be suitable for admission to the cache if a storage client repeatedly accesses the data (as indicated by the access metric of the data). Similarly, data that does not satisfy the access threshold may be admitted if the sequentiality metric indicates that the data is not part of a sequential data access.

In some embodiments, the cache admission module 444 may apply one or more dynamic cache admission thresholds to determine cache admission. For example, data having a sequentiality metric indicating that it is part of a sequential data access may be subject to a more stringent access threshold. Similarly, data having a low access metric (e.g., an access metric that fails to satisfy the access threshold) may be subject to a more stringent sequentiality threshold. In another example, data having a sequentiality metric indicating that it is not part of a sequential data access may be subject to a less stringent access threshold, and data having a high access metric, which satisfies the access threshold, may be subject to a less stringent sequentiality threshold.

Figure 15A:
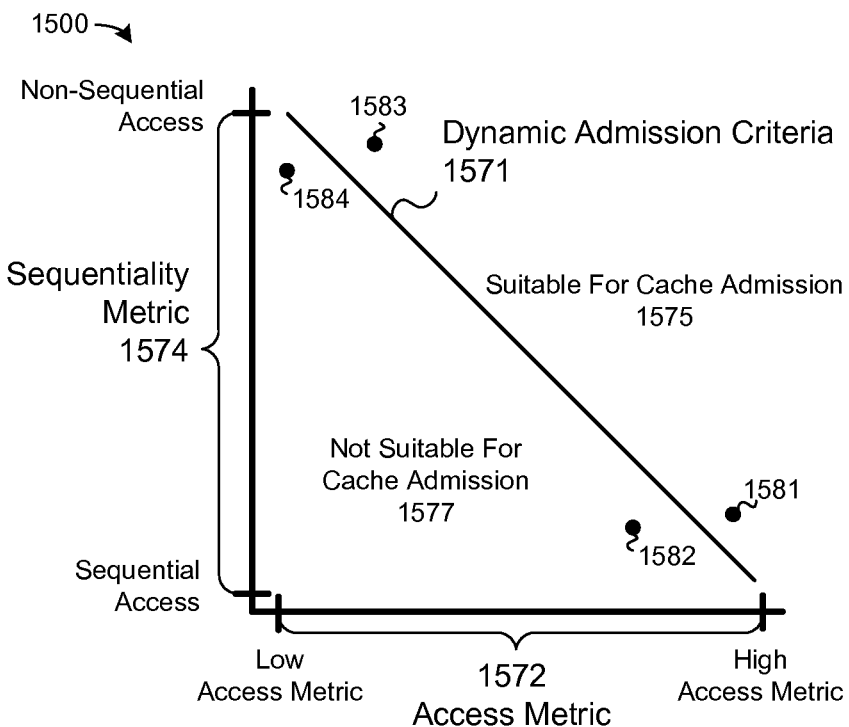
FIG. 15A is a plot depicting one example of dynamic admission criteria.

FIG. 15 is a plot 1500 depicting one example of a dynamic cache admission criteria 1571 based upon sequentiality and access metrics. The plot 1500 comprises an access metric axis 1572 ranging from a low access metric to a high access metric and a sequentiality metric axis 1574 ranging from a sequentiality metric indicating a sequential access to a metric indicating a non-sequential access. The sequentiality metric is considered because, as discussed above, data that is part of a sequential data access may pollute the cache, whereas data that is not part of a sequential access may be more suitable for cache admission. The dynamic admission criteria 1571 distinguishes data suitable for admission to the cache (region 1575) from data that is not suitable for admission to the cache (region 1577). As illustrated in the plot 1500, data having a high access metric may be admitted into the cache even through the sequentiality metric indicates a sequential data access (point 1581). Since the sequentiality metric of point 1581 indicates that the data is part of a sequential access, it may be subject to a higher access threshold for admission to the cache. For instance, data of point 1582 may not be admitted into the cache despite having a relatively high access metric, since the access metric fails to satisfy the more stringent access threshold applied due to its sequentiality metric. In another example, data of point 1583 may be admitted into the cache due to its sequentiality metric indicating that the data is not part of a sequential access, despite having a relatively low access metric. Data of point 1584 may not be admitted into the cache despite its favorable sequentiality metric, due to the access metric failing to satisfy the less stringent access threshold.

Although the dynamic admission criteria 1571 is depicted as linear, the disclosure is not limited in this regard and could be adapted to apply other types of dynamic admission criteria including parabolic, curved, exponential, or the like. Moreover, the disclosure is not limited to dynamic admission criteria in which the sequentiality and access metrics are equally rated.

Figure 15B:
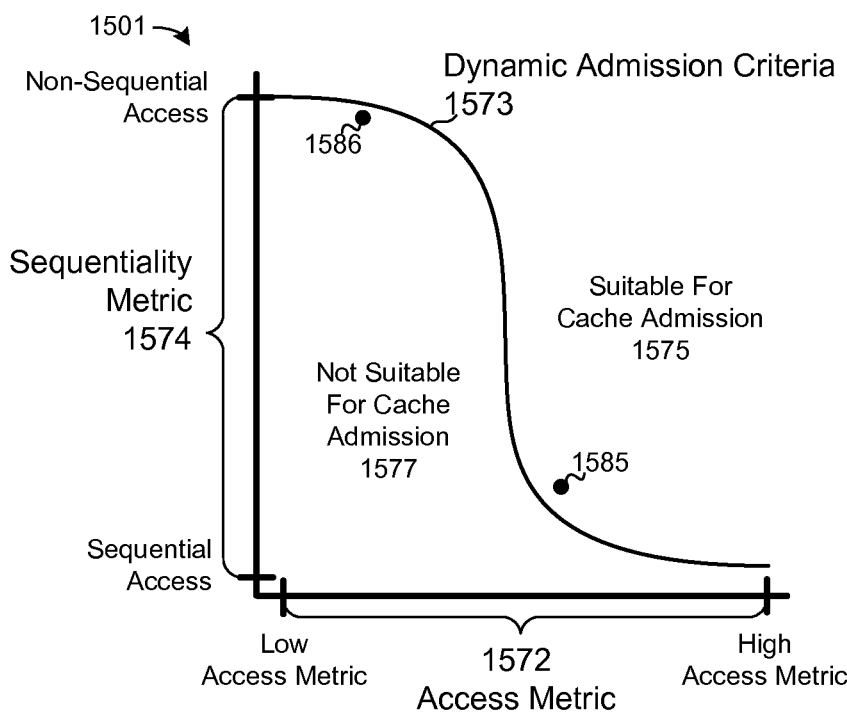
FIG. 15B is a plot depicting another example of dynamic admission criteria.

FIG. 15B is a plot 1501 depicting another example of a dynamic admission criteria 1573. The dynamic admission criteria 1573 gives more weight to the access metric 1572 than the sequentiality metric 1574. As shown at point 1585, data having a relatively high access metric may be admitted into the cache with little regard to the sequentiality metric. Conversely, and as shown at point 1586, data having a relatively low access metric may be not admitted despite a sequentiality metric indicative of a non-sequential access.

Figure 15C:
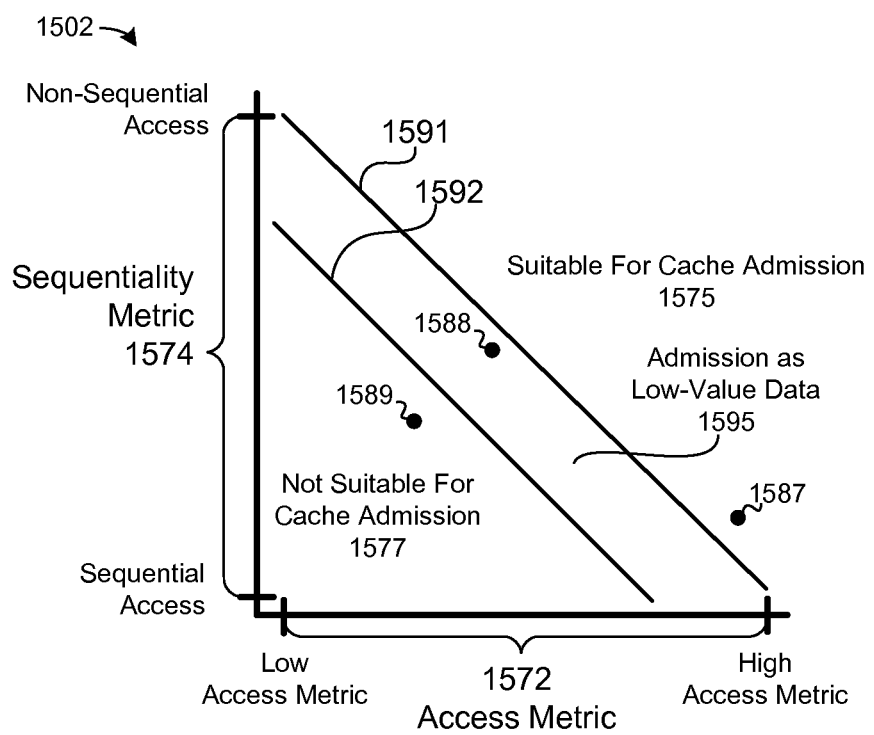
FIG. 15C is a plot depicting another example of dynamic admission criteria including low-value admission criteria.

FIG. 15C is a plot 1502 depicting another example of dynamic admission criteria comprising an admission criteria 1591 and low-value admission criteria 1592. The admission criteria 1591 and 1592 may define an admission region 1575, a non-admission region 1577, and a low-value admission region 1578. Data having an access metric and/or sequentiality metric that falls into the admission region 1575 may be admitted into the cache (e.g., data of point 1587). Data that fails to satisfy the admission criteria 1591, but satisfies the low-value admission criteria 1592 may be admitted as low-value data, as described above (e.g., data of point 1588). Data that fails to satisfy either criteria 1591 or 1592 may not be admitted into the cache (e.g., data of point 1589).

Figure 16:
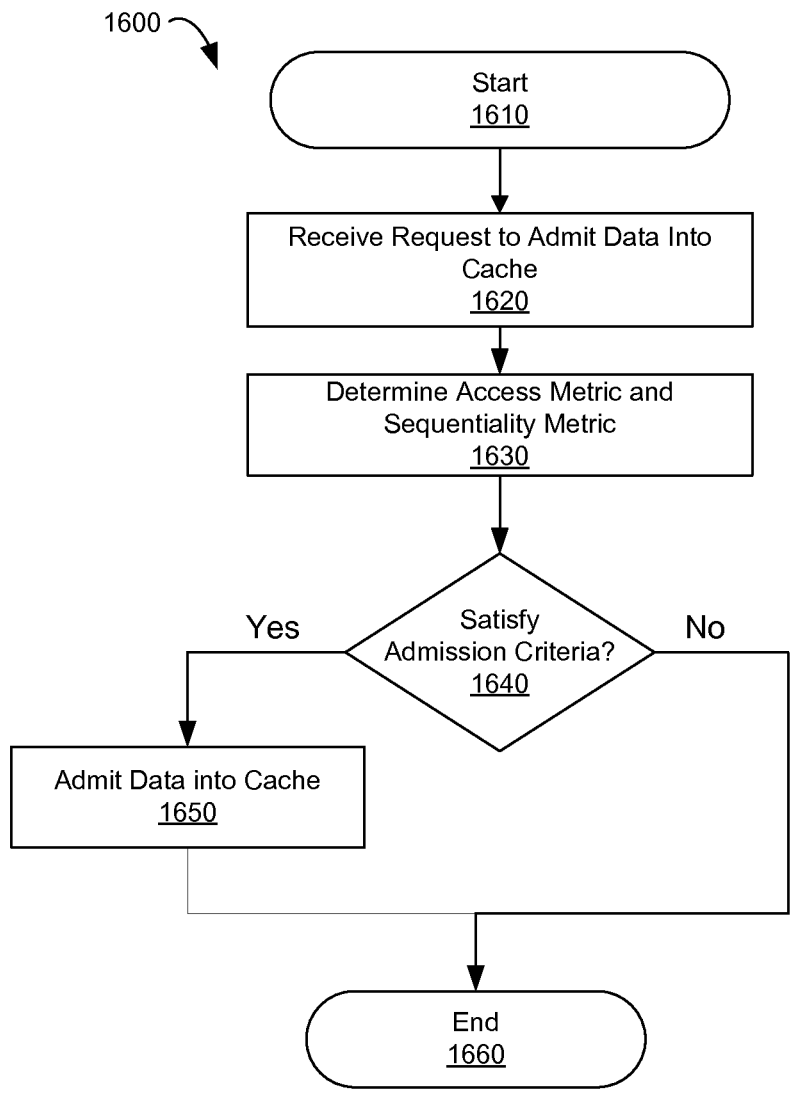
FIG. 16 is a flow diagram of one embodiment of a method for managing cache admission using an access metric and a sequentiality metric.

FIG. 16 is a flow diagram of one embodiment of a method for 1600 for managing admission into a cache. At step 1610, the method 1600 starts and is initialized. Step 1610 may further comprise caching data on a non-volatile storage device using a storage layer, and maintaining access metadata pertaining to data accesses in a logical address space, as described above.

Step 1620 may comprise receiving a request to admit data into the cache, as described above. Step 1630 may comprise determining an access metric of the data and a sequentiality metric of the data using access metadata, as described above.

Step 1640 may comprise determining whether the data is suitable for admission to the cache. Step 1640 may be implemented by the cache admission module 444 of the cache layer 440. Step 1640 may comprise comparing the access metric to an access threshold and/or the sequentiality metric to a sequentiality threshold. The comparison of step 1640 may be dynamic, according to the values of the access metric and/or the sequentiality metric determined at step 1630. As described above, data having sufficiently high access metric may be admitted into the cache regardless of the sequentiality metric (and/or may be subject to a less stringent sequentiality metric). Similarly, data having a sequentiality metric indicating that the data is not part of a sequential access may be admitted into the cache regardless of the access metric (and/or may be subject to a less stringent access threshold). The admission criteria of step 1640 may be tuned according to access characteristics of a computing device and/or one or more storage clients.

If the data satisfies the admission criteria of step 1540, the flow continues to step 1550 where the data is admitted into the cache, as described above; otherwise, the flow ends at step 1560 until a next request to admit data into the cache is received.

The above description provides numerous specific details for a thorough understanding of the embodiments described herein. However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product including a computer-readable storage medium having stored instructions thereon that may be used to program a computer (or other electronic device) to perform processes described herein. The computer-readable storage medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of medium/machine-readable medium suitable for storing electronic instructions.

As used herein, a software module or component may include any type of computer instruction or computer executable code located within a memory device and/or computer-readable storage medium. A software module may, for instance, comprise one or more physical or logical blocks of computer instructions, which may be organized as a routine, program, object, component, data structure, etc., that perform one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

It will be understood by those having skill in the art that many changes may be made to the details of the above-described embodiments without departing from the underlying principles of the disclosure.

We claim:

1. A method for managing a cache of a non-volatile storage device, the method comprising:
   caching data on a non-volatile storage device using an index maintained by a storage layer of the non-volatile storage device, the index associating logical identifiers of a logical address space corresponding to a backing store with physical storage locations of the non-volatile storage device;
   maintaining access metadata configured to indicate access characteristics of logical identifiers within the logical address space;
   updating an access metric of a logical identifier in the access metadata in response to a request to access data of the logical identifier; and
   admitting data associated with the logical identifier into the cache in response to the access metric satisfying an access threshold.

2. The method of claim 1, wherein the access metadata indicates access characteristics of logical addresses throughout the logical address space, including logical addresses that do not correspond to data admitted into the cache.

3. The method of claim 2, wherein an access data structure comprises a plurality of entries, each entry indicating access characteristics of one or more logical identifiers during a respective interval.

4. The method of claim 3, wherein each entry comprises one of,
   a single bit of a bitmap, the single bit indicating an access to the one or more logical identifiers corresponding to the entry, and
   a counter indicating accesses to the one or more logical identifiers corresponding to the entry.

5. The method of claim 3, wherein each entry indicates access characteristics of a respective plurality of logical identifiers, and wherein the number of logical identifiers corresponding to each entry is determined by a user preference.

6. The method of claim 3, wherein each access data structure entry indicates accesses to a plurality of logical identifiers, the method further comprising mapping a logical identifier to an access data structure entry using one of,
   a hash mapping to map each of a plurality of logical identifiers to a respective access data structure entry by way of a hash function, a contiguous range mapping to map contiguous address ranges of logical identifiers to respective access data structure entries, and a hybrid mapping to map each of a plurality of contiguous ranges of logical identifiers to a respective access data structure entry by way of a hash function.

7. The method of claim 1, wherein the access metadata comprises an ordered set of access data structures, each tracking logical identifier accesses during a respective interval, the ordered set comprising a current access data structure and one or more previous access data structures, the method further comprising:

determining an access metric of the logical identifier by combining access data in the ordered set of access data structures.

8. The method of claim 1, wherein the access metadata comprises an ordered set of access data structures, each tracking logical identifier accesses during a respective interval, the ordered set comprising a current access data structure and one or more previous access data structures, the method further comprising:

updating the current access data structure to indicate logical identifier access requests;

generating a new access data structure free from indications of logical identifier access requests in response to an interval trigger; and using the ordered set of access data structures to determine the access metric of the logical identifier.

9. The method of claim 1, further comprising:

determining a sequentiality metric of the request to access the logical identifier, wherein the sequentiality metric indicates a likelihood that the request is part of a sequential data access; and admitting the data into the cache in response to the sequentiality metric indicating a non-sequential data access.

10. The method of claim 1, wherein maintaining the access metadata comprises maintaining a time ordered record of access requests in the logical address space, the method further comprising:

determining a sequentiality metric of the logical identifier based upon the time ordered record of access requests, wherein the sequentiality metric indicates a likelihood that the access request is part of a sequential data access; and admitting the data into the cache in response to one of,
the sequentiality metric indicating a non-sequential data access and the access metric satisfying an access threshold,
the sequentiality metric indicating a non-sequential data access and the access metric failing to satisfy the access threshold, and
the sequentiality metric indicating a sequential data access and the access metric satisfying the access threshold.

11. The method of claim 1, further comprising, in response to admitting the data into the cache, accessing an access metric of a proximate logical identifier that is within a pre-determined address range of the logical identifier in the logical address space; and admitting data of the proximate logical identifier in response to the access metric of the proximate logical identifier satisfying a proximate logical identifier access threshold of the cache admission criteria.

12. The method of claim 1, further comprising:

admitting the data into the cache and associating the data with a low-value indication in response to the access metric failing to satisfy an access threshold of the cache admission criteria and satisfying a second, lower access threshold of the cache admission criteria; and evicting the data from the cache before other data in the cache based upon the low-value indication.

13. The method of claim 1, wherein a logical capacity of the logical address space exceeds a physical storage capacity of the non-volatile storage device.

14. An apparatus for managing admission of data into a cache, comprising:

a storage layer of a non-volatile storage device to maintain storage metadata pertaining to a backing store, the storage metadata comprising an index associating logical identifiers of a logical address space corresponding to the backing store with physical storage locations of the non-volatile storage device;

a cache layer configured to update access metadata to indicate access requests to logical identifiers within the logical address space, wherein the cache layer updates the access metadata in response to requests pertaining to data that is not cached on the non-volatile storage device; and a cache admission module configured to determine an access metric of a logical identifier using the access metadata, and to admit data of the logical identifier into the cache in response to the access metric satisfying an access threshold.

15. The apparatus of claim 14, wherein the access metadata comprises an ordered set of access data structures, each tracking logical identifier accesses during a respective interval, the ordered set comprising a current access data structure and one or more previous access data structures, wherein the cache layer is configured to, update the current access data structure to indicate logical identifier access requests;

generate a new access data structure free from indications of logical identifier access requests in response to an interval trigger;

determine the access metric of the logical identifier using the ordered set of access data structures.

16. The apparatus of claim 15, wherein an access data structure comprises a plurality of entries, each entry indicating access characteristics of one or more logical identifiers during a respective interval, and wherein each entry comprises one of a single bit of a bitmap, the single bit indicating an access to the one or more logical identifiers corresponding to the entry, and a counter indicating accesses to the one or more logical identifiers corresponding to the entry.

17. The apparatus of claim 15, wherein an access data structure comprises a plurality of entries, each entry indicating access characteristics of one or more logical identifiers, wherein each entry indicates access characteristics of a respective plurality of logical identifiers, preference, and wherein the cache layer is configured to map a logical identifier to an entry using one of, a hash mapping to map each of a plurality of logical identifiers to a respective access data structure entry by way of a hash function, a contiguous range mapping to map contiguous address ranges of logical identifiers to respective access data structure entries, and a hybrid mapping to map each of a plurality of contiguous ranges of logical identifiers to a respective access data structure entry by way of a hash function.

18. The apparatus of claim 14, wherein the cache admission module is configured to determine a sequentiality metric of the request to access the logical identifier, wherein the sequentiality metric indicates a likelihood that the request is part of a sequential data access, and wherein the cache admission layer admits the data into the cache in response to the sequentiality metric indicating a non-sequential data access.

19. A non-transitory computer-readable storage medium comprising instructions configured to cause a computing device to perform a method for managing a cache of a non-volatile storage device, the method comprising:
- caching data on a non-volatile storage device using an index maintained by a storage layer of the non-volatile storage device, the index associating logical identifiers of a logical address space corresponding to a backing store with physical storage locations of the non-volatile storage device;
- maintaining access metadata comprising entries indicating access characteristics of each logical identifier within the logical address space, including logical identifiers corresponding to data that is not cached on the non-volatile storage device;
- updating an entry of the access metadata to indicate a data access to a logical identifier in response to a request to access data of the logical identifier;
- determining an access metric of the logical identifier using the entry of the logical identifier in the access metadata; and
- admitting data associated with the logical identifier into the cache in response to the access metric satisfying an access threshold.

20. The computer-readable storage medium of claim 19, wherein the access metadata comprises an ordered set of access data structures, each comprising a plurality of entries, each entry comprising access characteristics of one or more logical identifiers during a respective interval, the ordered set comprising a current access data structure and one or more previous access data structures, the method further comprising:
- updating the current access data structure to indicate logical identifier access requests;
- generating a new access data structure free from indications of logical identifier access requests in response to an interval trigger;
- using the ordered set of access data structures to determine the access metric of the logical identifier, wherein determining the access metric comprises weighting each of a plurality of entries according to a recency of the entries.

21. The computer-readable storage medium of claim 20, further comprising:
- determining a sequentiality metric of the logical identifier based upon a time ordered record of access requests, wherein the sequentiality metric indicates a likelihood that the access request is part of a sequential data access; and
- admitting the data into the cache in response to one of,
  - the sequentiality metric indicating a non-sequential data access and the access metric satisfying an access threshold,
  - the sequentiality metric indicating a non-sequential data access and the access metric failing to satisfy the access threshold, and
  - the sequentiality metric indicating a sequential data access and the access metric satisfying the access threshold.

* * * * *